United States Patent
Gutierrez et al.

(10) Patent No.: US 10,925,009 B2
(45) Date of Patent: Feb. 16, 2021

(54) DYNAMIC PROCESSING RESOURCE ALLOCATION ACROSS MULTIPLE CARRIERS

(71) Applicant: Apple Inc., Cupertino, CA (US)

(72) Inventors: Ismael Gutierrez, San Jose, CA (US); Ali Moaz, Nuremberg (DE); Mahima Mehta, Indore (IN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/423,043

(22) Filed: May 27, 2019

(65) Prior Publication Data
US 2020/0383066 A1 Dec. 3, 2020

(51) Int. Cl.
*H04W 52/24* (2009.01)
*H04B 17/336* (2015.01)
*H04W 8/24* (2009.01)
*H04W 24/10* (2009.01)
*H04L 5/00* (2006.01)

(52) U.S. Cl.
CPC ........ *H04W 52/246* (2013.01); *H04B 17/336* (2015.01); *H04L 5/001* (2013.01); *H04W 8/24* (2013.01); *H04W 24/10* (2013.01); *H04W 52/241* (2013.01)

(58) Field of Classification Search
CPC ...... H04B 17/336; H04W 8/24; H04W 24/10; H04W 52/241; H04L 5/001
See application file for complete search history.

(56) References Cited

U.S. PATENT DOCUMENTS

| | | | |
|---|---|---|---|
| 2014/0086081 A1* | 3/2014 | Mack | H04L 5/006 370/252 |
| 2015/0189548 A1* | 7/2015 | Ahmad | H04W 28/08 370/235 |
| 2015/0334653 A1* | 11/2015 | Ang | H04W 52/0219 370/311 |
| 2016/0127059 A1* | 5/2016 | Bao | H04B 17/104 370/252 |
| 2017/0041804 A1* | 2/2017 | Goedken | H04W 52/367 |
| 2017/0280175 A1* | 9/2017 | Fein | H04N 21/858 |
| 2018/0020396 A1* | 1/2018 | Yoshimura | H04W 84/12 |
| 2018/0124784 A1* | 5/2018 | Kumar | H04W 52/0206 |
| 2018/0139702 A1* | 5/2018 | Ramkumar | H04W 52/16 |
| 2019/0103949 A1* | 4/2019 | Harrison | H04L 5/0091 |
| 2019/0104469 A1* | 4/2019 | Ge | H04W 52/0235 |
| 2019/0364464 A1* | 11/2019 | Shaikh | H04L 12/1407 |
| 2020/0053755 A1* | 2/2020 | Ang | H04W 72/14 |

* cited by examiner

*Primary Examiner* — Chi Ho A Lee
(74) *Attorney, Agent, or Firm* — Kowert, Hood, Munyon, Rankin & Goetzel, P.C.

(57) ABSTRACT

A communication device includes a controller configured to identify a plurality of carriers for carrier aggregation; and an estimation processor configured to determine, for a first device processing resource of the communication device, throughput gain values that estimate an increase in throughput from using the device processing resource with the plurality of carriers. The controller further is configured to determine efficiency metrics for the first device processing resource based on the throughput gain values and power penalty values that estimate a power penalty from using the first device processing resource with the plurality of carriers, and select, based on the efficiency metrics, a first carrier of the plurality of carriers to which to assign the first device processing resource.

20 Claims, 12 Drawing Sheets

| Carrier | Baseline | Resource A | Resource B | Resource C | Resource D |
|---|---|---|---|---|---|
| C0 | 40 | 20 | 0 | 0 | 0 |
| C1 | 50 | 10 | 5 | 5 | 0 |
| C2 | 45 | 15 | 10 | 10 | 0 |
| C3 | 60 | 5 | 0 | 0 | 10 |
| C4 | 30 | 15 | 0 | 0 | 15 |
| C5 | 70 | 0 | 5 | 5 | 0 |
| C6 | 25 | 10 | 10 | 10 | 0 |
| C7 | 55 | 5 | 5 | 5 | 0 |

DYNAMIC PROCESSING RESOURCE ALLOCATION ACROSS MULTIPLE CARRIERS

TECHNICAL FIELD

Various embodiments relate generally to methods and devices for dynamically allocating device processing resources across multiple carriers.

BACKGROUND

Cellular networks often use carrier aggregation (CA) to increase throughput. For example, in the downlink direction the network may concurrently transmit downlink data to a terminal device on multiple radio carriers. Conversely, in the uplink direction a terminal device may concurrently transmit uplink data to a network on multiple radio carriers. Because the multiple carriers have larger total bandwidth than a single one of the carriers, the radio link can deliver significantly more data to the target device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
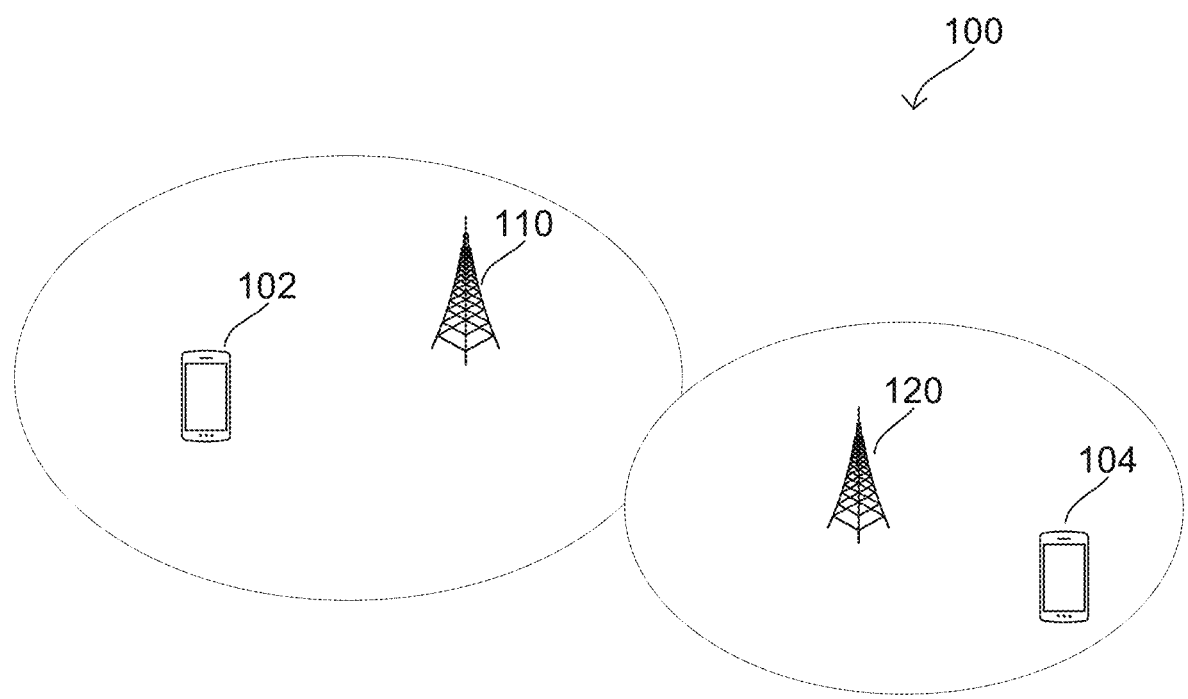
FIG. 1 shows an exemplary radio communication network according to some aspects.

The following detailed description refers to the accompanying drawings that show, by way of illustration, specific details and aspects of embodiments in which the invention may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "lesser subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers.

Figure 2:
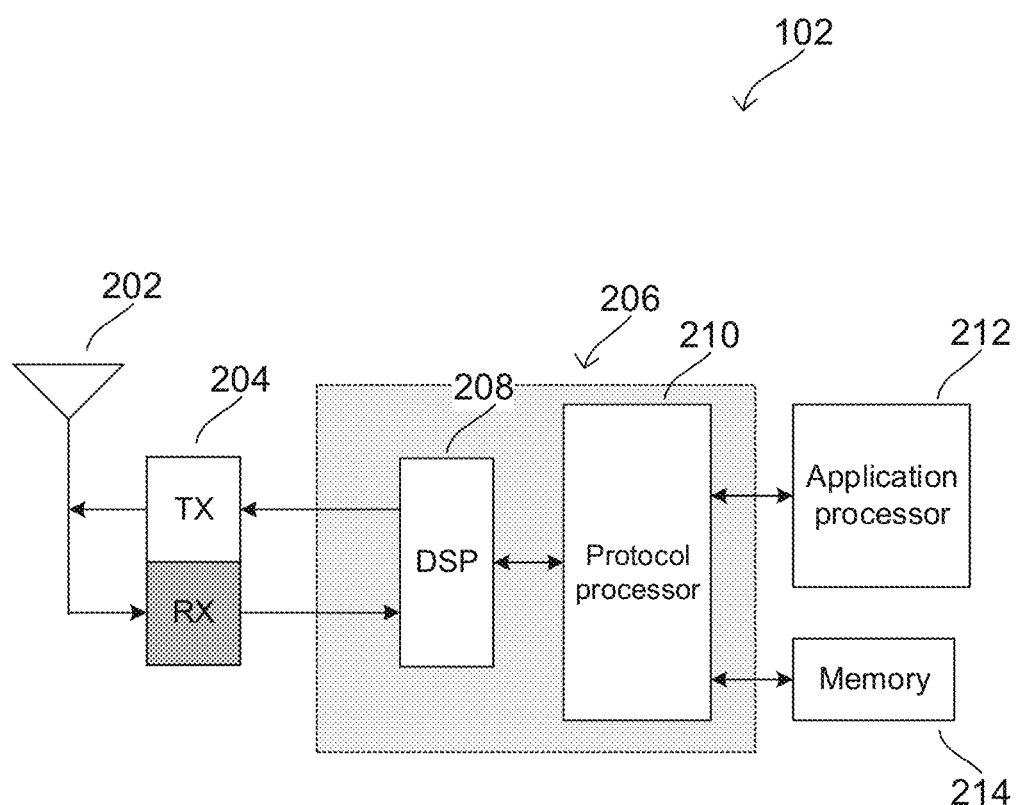
FIG. 2 shows an exemplary internal configuration of a terminal device according to some aspects.

FIGS. 1 and 2 depict an exemplary network and device architecture for wireless communications. Starting with FIG. 1, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples may be applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks. The cellular core network may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104. The core network may also provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Terminal devices 102 and 104 and network access nodes 110 and 120 may therefore follow the defined communication protocols to transmit and receive data over the radio access network of radio communication network 100. The core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of terminal device 102 according to some aspects. As shown in FIG. 2, terminal device 102 may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct this communication functionality of terminal device 102 according to the communication protocols associated with each radio access network. Baseband modem 206 may thus control antenna system 202 and RF transceiver 204 to transmit and receive radio signals according to the formatting and scheduling parameters for the communication protocols. In some aspects where terminal device 102 is configured to operate on multiple radio communication technologies, terminal device 102 may include separate communication components for each supported radio communication technology (e.g., a separate antenna, RF transceiver, digital signal processor, and controller).

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) for baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), with which RF transceiver 204 may convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals for antenna system 202 to wirelessly transmit. RF transceiver 204 may include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204. This may include specifying the radio frequencies RF transceiver 204 to transmit or receive on.

As shown in FIG. 2, baseband modem 206 may include digital signal processor 208, which may perform physical layer (PHY; Layer 1) transmission and reception processing. In the transmit path, digital signal processor 208 may prepare outgoing transmit data (from protocol controller 210) for transmission via RF transceiver 204. In the receive path, digital signal processor 208 may prepare incoming received data (from RF transceiver 204) for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions. The one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) according to the communication protocols of each supported radio communication technology. In some aspects, protocol controller 210 may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals according to the protocol stack control logic in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to transfer application layer data to and from radio terminal device 102 with the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU configured to handle the layers above the protocol stack, including the transport and application layers. Application processor 212 may be configured to execute various applications and/or programs of terminal device 102 at an application layer of terminal device 102. These applications and/or programs may include an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between network access nodes of the radio access network of radio communication network 100. As each network access node of radio communication network 100 may have a respective coverage area, terminal devices 102 and 104 may be configured to select and re-select between the available network access nodes to maintain a strong radio link with the radio access network of radio communication network 100. For example, terminal device 102 may establish a radio link with network access node 110 while terminal device 104 may establish a radio link with network access node 112. In the event that the current radio link degrades, terminal devices 102 or 104 may seek a new radio link with another network access node of radio communication network 100. For example, terminal device 104 may move from the coverage area of network access node 112 into the coverage area of network access node 110. As a result, the radio link with network access node 112 may degrade. Terminal device 104 may detect that degradation with radio measurements such as signal strength or signal quality measurements of network access node 112. Depending on the mobility procedures defined in the appropriate network protocols for radio communication network 100, terminal device 104 may seek a new radio link (which may be, for example, triggered at terminal device 104 or by the radio access network).

In some cases, terminal device 104 may search for a new radio link by performing radio measurements on neighboring network access nodes to determine whether any neighboring network access nodes can provide a suitable radio link. As terminal device 104 may have moved into the coverage area of network access node 110, terminal device 104 may identify network access node 110 (which may be selected by terminal device 104 or selected by the radio access network) and transfer to a new radio link with network access node 110. These mobility procedures, including radio measurements, cell selection/reselection, and handover, are defined in the various network protocols.

This disclosure provides various aspects for devices to assign resources to the active carriers in a carrier aggregation scheme. Due to physical limitations in device design, there may be some scenarios where the device cannot assign a full set of resources to each carrier. For example, devices may not be able to use each of its antennas to receive data on each carrier, or may not be able to perform advanced interference cancelation on the received data from each carrier. Given these limitations, the devices of this disclosure may utilize a resource assignment technique to efficiently assign available resources to the active carriers. In some aspects, the device may determine this assignment based on the estimated throughput gain from assigning various resources to certain carriers. The device may also determine this assignment based on the estimated power penalty from assigning various resources to certain carriers. By considering the estimated throughput gain and/or power penalty, the device may assign resources to carriers in a way that balances throughput versus power. Furthermore, in some aspects the device may also overreport its carrier aggregation capabilities to the network. Because the device can dynamically assign resources to carriers in an intelligent manner, the device can adapt to the network's assigned CA configuration with the resource assignment technique.

As background, many radio communication networks use carrier aggregation (CA) to increase the throughput of radio links. In carrier aggregation, each carrier provides a different channel for the devices to transmit and receive. For example, in the downlink direction a network access node may map multiple streams of data (layers) to multiple carriers and concurrently transmit the multiple data streams to a terminal device on the multiple carriers. Compared to using only one of the carriers, carrier aggregation can significantly increase the downlink bandwidth and in turn increase the downlink throughput. Terminal devices and network access nodes can similarly use carrier aggregation in the uplink direction. In the uplink case, a terminal device increases uplink throughput by transmitting multiple uplink data streams to a network access node on multiple carriers.

In some cases, communication devices may combine carrier aggregation with multiple antenna techniques, such as by using MIMO techniques on multiple carriers. For example, receiving and transmitting devices may use multiple receive antennas to improve spatial diversity or to increase spatial multiplexing gain. To improve spatial diversity at a receiving device, for instance, the receiving device may receive the same transmitted signal on multiple receive antennas. Since the respective receive antennas have different propagation paths with the transmit antenna (or antennas), the device can combine together the received signals.

This can produce a combined received signal with higher diversity gain and better reliability. To improve spatial multiplexing gain at a receiver, a transmitting device may transmit N separate data streams on N transmit antennas. The receiving device can then receive the transmitted signal on N receive antennas. Since the wireless channels are different between the various receive and transmit antennas, the receiving device can process the received signals to recover the N original data streams (e.g., using MIMO detection techniques). With this spatial multiplexing, the devices can re-use the same channel to deliver multiple data streams, thus increasing system throughput.

While these MIMO techniques can improve reliability and throughput for carrier aggregation, design constraints may limit the performance gains in practice. For example, a receiving device may support four-stream MIMO for a single carrier, meaning that the device has four physical receive antennas and can route a stream from each antenna to the baseband modem. This is referred to herein with the numRx notation "4rx," where numRx is a parameter defining how many antenna data streams the device can receive on a given carrier and where 4rx means the device supports four antenna data streams for a given carrier. This disclosure uses this same numRx notation for other numbers of receive streams, such as 2rx for two antenna data streams for a given carrier. When the number of carriers increases, the routing complexity linearly scales. To support four-stream MIMO (4rx) for four carriers (4CA), for example, the device would need to route 16 antenna data streams in total to the baseband (four streams from each of the four carriers); for 7CA, the device would need to route 28 antenna data streams. In practice, it may be physically complex and expensive to configure the device's hardware to actually support these high numbers of antenna data streams. For example, the device may have a limited number of physical buses from the physical antennas to the baseband modem (via the RF transceiver), and the physical buses may only have a limited capacity. In another example, the RF transceiver's analog circuitry (e.g., multiplexers and other analog hardware) may only be capable of processing a limited number of streams at a time.

Due to these physical constraints, the device may therefore physically be able to deliver only a maximum number of antenna data streams from the antennas to the baseband modem. The device may thus not be able to provide full support (meaning, e.g., one stream for each physical antenna) for all of the carriers in each possible CA configuration. In one example, a device may have four physical antennas but only be able to route 16 data streams total from the antennas to the baseband modem (e.g., a total number of 16 supported antenna data streams). When the device uses a higher order CA scheme like 5CA (five carriers), the number of physical antenna streams (e.g., 5×4=20) can exceed the total number of supported antenna data streams. The device may therefore not be able to use all four physical antennas with each carrier in all of the possible CA schemes; in other words, the device may not be able to provide 4rx operation for all of the carriers.

In addition to those limitations in the number of antenna-modem pathways, devices may also have a limited number of baseband processing resources. For example, deploying enough advanced baseband features to fully support all carriers may be expensive and inefficient for both silicon area and power usage. A device's baseband modem may therefore provide advanced baseband features for a maximum number of carriers. In one example, the baseband modem may include advanced interference cancellation hardware that can only provide interference cancellation for a maximum number of carriers. Additionally, some advanced baseband features may only work with a limited number of antenna data streams. For instance, a special interference cancellation feature may only work with a maximum of two antenna data streams (2rx), and thus may not work with four antenna data streams (4rx). If the device enables that feature for a certain carrier, it may thus only be able to handle two antenna data streams on that carrier.

Due to these silicon area, cost, and power efficiency factors, devices may not provide enough device processing resources to fully support all carriers in every CA configuration (e.g., every order of carrier aggregation). Aspects of this disclosure describe resource assignment techniques with which a device can efficiently assign available device processing resources to carriers. In some aspects, the device may assign device processing resources to carriers based on the estimated throughput gain. To determine this estimated throughput gain, the device may estimate the improvement in throughput that would result from assigning a certain device processing resource (e.g., a number of antenna data streams like 2rx, 4rx, etc., or a specific advanced baseband feature) to a given carrier. The device may also assign the device processing resources based on the estimated power penalty. For example, the device may estimate the power penalty from using a certain device processing resource on a given carrier. By considering both estimated throughput gain and power penalty, the device may assign device processing resources to carriers in a manner that balances throughput versus power usage.

Some aspects also provide a mechanism for devices to reduce control signaling overhead. In some cellular networks, terminal devices may report their carrier aggregation capabilities to the network, and the network may then select a CA configuration based on the reported capabilities. In one example, a terminal device may report, for each CA configuration, the number of layers that it supports for each carrier of the CA configuration. Normally, the number of supported layers depends on the total number of supported antenna data streams. If a terminal device can deliver a maximum of 16 antenna data streams from its antennas to its baseband modem, it can support a maximum of 16 layers (one antenna data stream per layer). The contents of the capability messages may therefore indicate how many layers the terminal device supports for each carrier. If the terminal device supports, for instance, 16 total layers, for 5CA it may report its capabilities by sending a capability message including strings like (4-4-4-2-2), (4-4-2-2-4), (4-2-2-4-4), and so forth. The string (4-4-4-2-2) indicates that the terminal device supports four layers on the first carrier, four layers on the second carrier, four layers on the third carrier, two layers on the fourth carrier, and two layers on the fifth carrier. Because the terminal device supports 16 total antenna data streams, the terminal device can similarly send the string (4-4-2-2-4), which is another possibility for distributing 16 layers across five carriers. This string means the device could also support four layers on the first carrier, four layers on the second carrier, two layers on the third carrier, two layers on the fourth carrier, and four layers on the fifth carrier. For terminal devices that support higher CA orders, such as κCA, 7CA, and so forth, the capability messages will include a set of strings for each CA order (e.g., a first set of strings for 2A capabilities, a second set of strings for 4CA capabilities, and so on). These capability messages can thus become very large, and in some cases can even exceed the UE capability message size limit.

Recognizing this issue, this disclosure provides aspects where a terminal device reduces the capability message size by overreporting its capabilities. For example, rather than indicating it only supports two layers for some carriers, the terminal device may report that it supports four layers for all carriers (in a four-antenna example). If the network then schedules a CA mode with more layers than the terminal device supports (e.g., more layers than the device's total number of supported antenna data streams), the terminal device adapt with the flexible resource allocation and other channel reporting techniques. These aspects can therefore reduce control signaling overhead and/or LUT memory storage.

Figure 3:
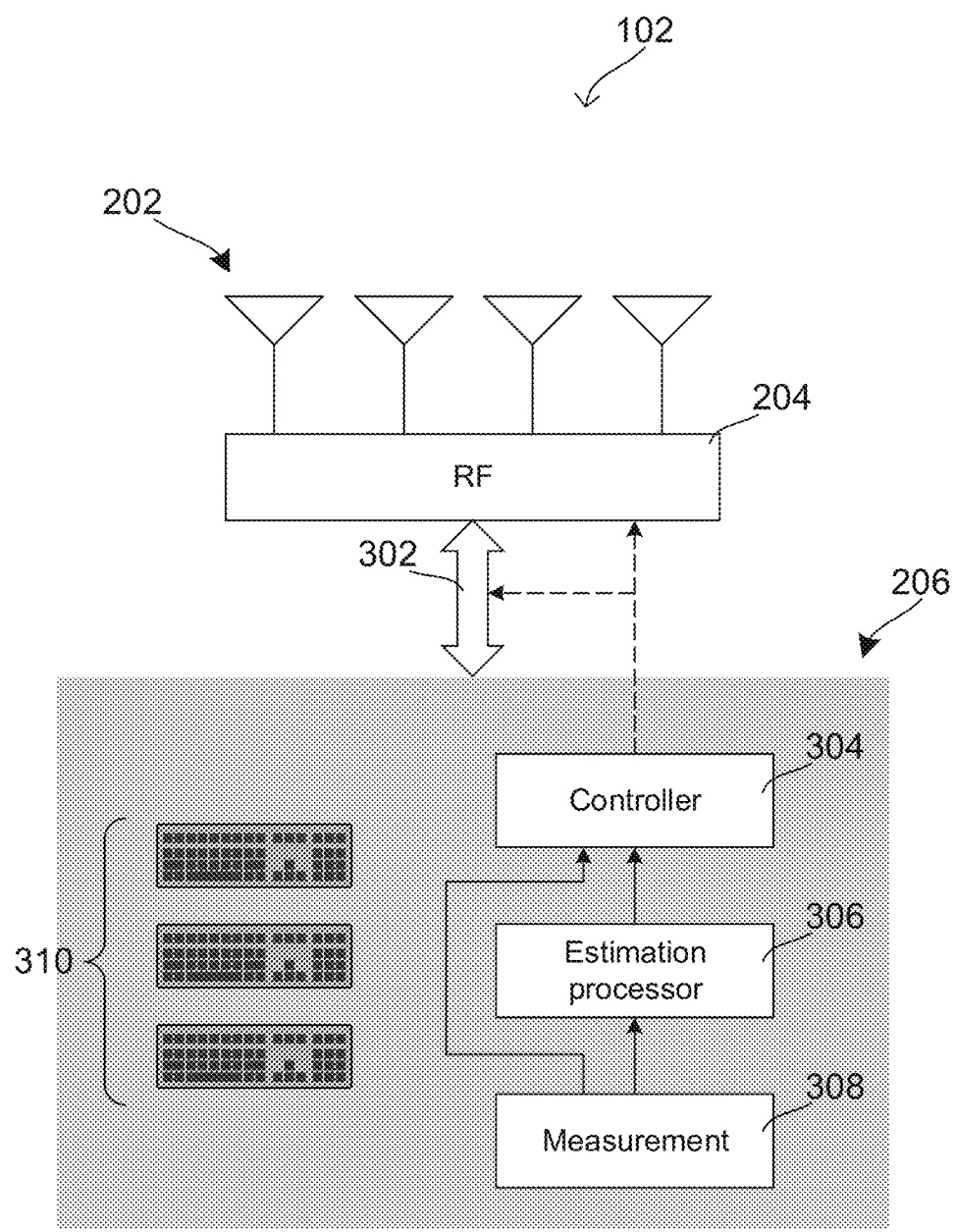
FIG. 3 shows an exemplary internal configuration of a terminal device configured for dynamic resource assignment in carrier aggregation according to some aspects.

This disclosure will first describe the resource assignment technique, followed by the capability reporting mechanism. FIG. 3 shows an exemplary internal configuration of terminal device 102 according to some aspects. Terminal device 102 may be configured to perform this disclosure's resource assignment technique. As shown in FIG. 2, terminal device 102 may include antenna system 202, RF transceiver 204, and baseband modem 206, which may be configured as described above for FIG. 2. In the example of FIG. 3, antenna system 202 is shown with four antennas. Thus, in the receive direction antenna system 202 may be capable of supporting up to four layers for each carrier. In other examples, the number of antennas, number numRx of antenna data streams for a carrier, and the maximum number of layers is scalable to any quantity.

In the configuration shown in FIG. 3, terminal device 102 may also include data bus 302, controller 304, estimation processor 306, measurement engine 308, and advanced baseband features 310. Data bus 302 may be set of data lines that interface RF transceiver 204 with baseband modem 206. Data bus 302 may have finite capacity. For example, data bus 302 may only be able to route a maximum amount of data from RF transceiver 204 to baseband modem 206. This may limit the total number of supported data streams from antenna system 202 that RF transceiver 204 can deliver to baseband modem 206. In some aspects, the hardware capabilities of RF transceiver 204 may also limit this total number of supported antenna data streams. For example, the hardware design of RF transceiver 204 (e.g., multiplexers or analog circuitry components) may only be capable of supporting a total number of supported antenna data streams.

As described above for FIG. 2, baseband modem 206 of terminal device 102 may include physical layer subcomponents (DSP 208) and protocol stack subcomponents (protocol processor 210). The subcomponents of baseband modem 206 may be part of those physical layer subcomponents (DSP 208) and/or those protocol stack subcomponents (protocol processor 210); in other words, the subcomponents shown in FIG. 3 are not limited to being physical layer or protocol stack layer components. Controller 304 of baseband modem 206 may be a controller configured to manage carrier aggregation and to assign device processing resources to carriers. In some aspects, controller 304 may be a protocol stack layer component, such as part of protocol processor 210, or may be a physical layer component, such as part of digital signal processor 208. Estimation processor 306 may be a processor configured to determine estimates of the throughput gain and power penalty for various device processing resources. These operations are described below in full for FIG. 4. In some aspects, estimation processor 306 may be a protocol stack layer component, such as part of protocol processor 210, or may be a physical layer component, such as part of digital signal processor 208.

Measurement engine 308 may be circuitry configured to perform channel measurements. In some aspects, measurement engine 308 may include digital hardware circuitry (e.g., an ASIC) configured to process digital data to determine channel measurements. In some aspects, measurement engine 308 may additionally or alternatively include one or more processors configured to execute software that processes digital data to determine channel measurements. In some aspects, measurement engine 308 may be part of baseband modem 206's physical layer, such as part of DSP 208.

Advanced baseband features 310 may be dedicated circuitry or software that perform specific processing operations for baseband modem 206. For example, a first advanced baseband feature 310a may be an interference cancellation circuit or processor (composed of hardware and/or software). Baseband modem 206 may feed a data stream (or streams) to first advanced baseband feature 310a, such as the data stream(s) from a specific carrier. First advanced baseband feature 310a may perform interference cancellation on the data stream(s) and provide the resulting back to baseband modem 206. The resulting data may have reduced interference In some aspects, one or more of advanced baseband features 310 may perform successive interference cancellation (SIC), interference cancellation and suppression (ICS), codeword interference cancellation (CWIC), a maximum likelihood (ML) receiver (e.g., using a sphere decoder algorithm), an iterative receiver (e.g., joint demapping and decoding), or an advanced channel estimator (e.g., for channels with sparse channel impulse responses).

In some aspects, one or more of advanced baseband features 310 may only be configured to support one carrier at a time. This may limit the maximum number of carriers that those advanced baseband features can process at a time (to perform their respective processing operations). In some aspects, one or more of advanced baseband features 310 may be configured to support up to a maximum number of carriers. For example, first advanced baseband feature 310a may be able to perform its processing operation on two carriers concurrently. This may also limit the number of carriers that those advanced baseband features can process at a time. Accordingly, controller 304 may only be able to assign a finite number of carriers to advanced baseband features 310.

In some aspects, one or more of advanced baseb and features 310 may work with up to a maximum number of antenna data streams. For example, advanced baseband features 310 may not be able to operate on all of the antenna data streams for all of the carriers in each CA configuration. In some aspects, advanced baseband features 310 may only be able to operate on a maximum number of antenna data streams for each carrier. For example, first advanced baseband feature 310a may only be able to operate on two antenna data streams per carrier (2rx). Thus, if terminal device 102 is receiving on a given carrier with 4rx (all four receive antennas of antenna system 202 receiving and providing a respective data stream to baseband modem 206 via RF transceiver 204 and data bus 302), first advanced baseband feature 310a may not be able to perform processing on that carrier. To generalize, if first advanced baseband feature 310a only supports a first number of antenna data streams per carrier, controller 304 may only be able to assign first advanced baseband feature 310a to perform processing on carriers that with the same or less antenna data streams than the first number. In some cases, first advanced baseband feature 310a may be able to perform processing on, for example, only two antenna data streams even when the carrier was configured for 4rx (e.g., perform processing on only some of the antenna data streams obtained for a carrier). The other advanced baseband features 310 may be configured in any of these manners. While FIG. 3 shows three advanced baseband features 310, the number of advanced baseband features can be scaled to any number. Because this disclosure focuses on assigning device processing resources to carriers, and not on the advanced baseband features themselves, advanced baseband features 310 can be any type of hardware or software and can perform any type of processing on the antenna data streams from carriers. Advanced baseband features 308 may be limited in how many data streams or carriers on which they can operate based on their physical constraints (e.g., a circuit only able to receive, produce, or process a certain number of inputs) and/or based on their computer resources (e.g., a processor that only has enough compute power to process a certain number of inputs).

As used herein, a device processing resource is a pathway between a receive antenna and baseband modem 206, or is an advanced baseband feature. As discussed above, terminal device 102 may support a maximum total number of antenna data streams; in other words, terminal device 102 may have a maximum total number of antenna-modem pathways that it can use at a time. Each of these pathways is therefore a device processing resource that controller 304 can assign to a given carrier. In some aspects, each pathway may include buses from the physical antennas of antenna system 202 to RF transceiver 204, the internal routing and circuitry of RF transceiver 204, and the data lines in data bus 302. Similarly, advanced baseband features 310 may only support processing on a maximum number of carriers at a time. Each of advanced baseband features 310 may also be a device processing resource that controller 304 can assign to a given carrier. The overall set of device processing resources (including both antenna-modem pathways and advanced baseband features) is referred to here as the device processing resources.

Figure 4:
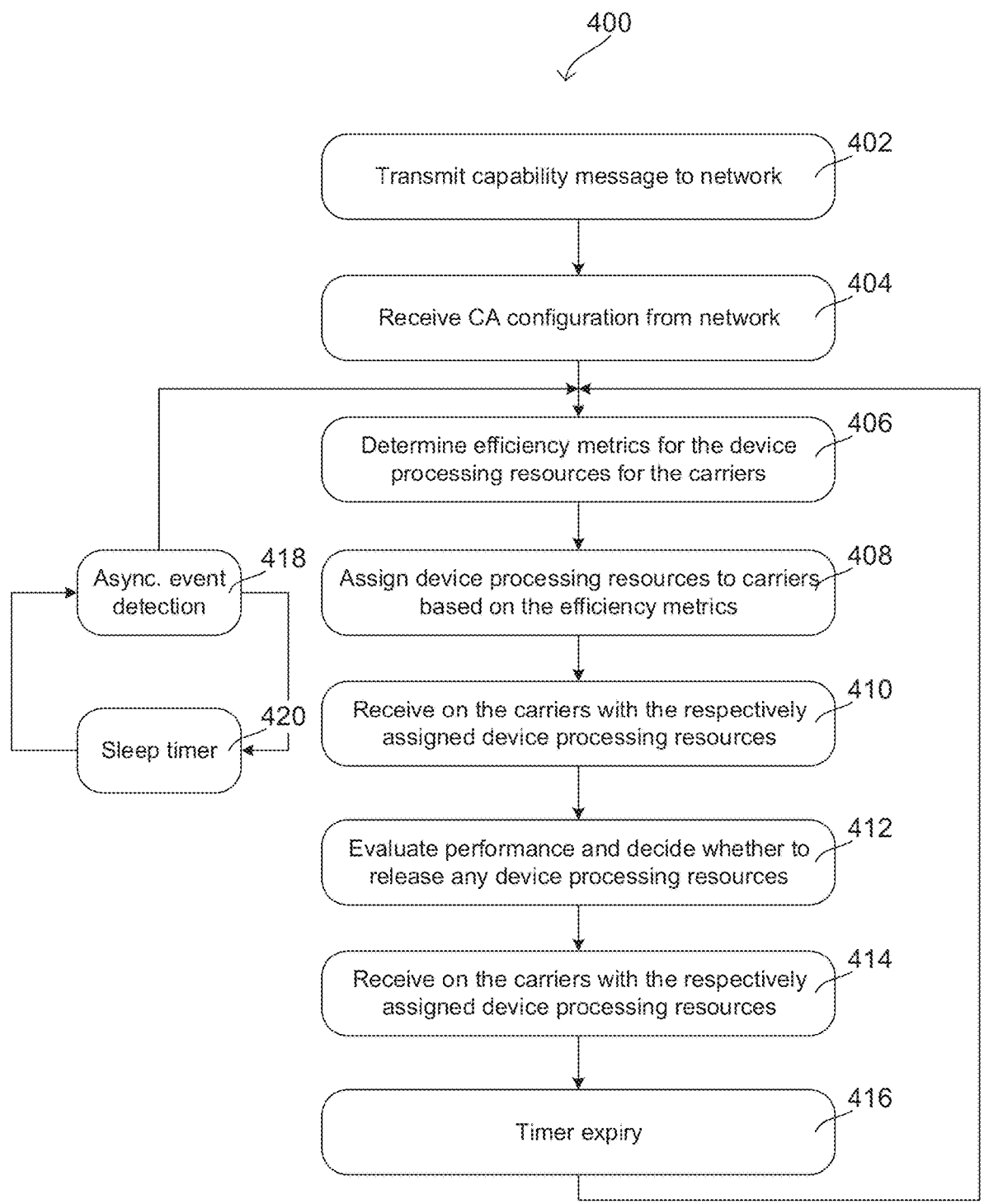
FIG. 4 shows an exemplary flow chart for assigning device processing resources to carriers according to some aspects.

Terminal device 102 may assign these device processing resources to carriers using the procedure of flow chart 400 in FIG. 4. As shown in FIG. 4, terminal device 102 may first send a capability message to the network in stage 402. Controller 304 may perform this operation, and therefore may generate a capability message and transmit it via RF transceiver 204 and antenna system 202. Controller 304 may generate the capability message in the format introduced above, such as where controller 304 specifies the number of layers that it supports for each carrier of each CA order. As described in that prior explanation, controller 304 may generate a capability message including strings that specify each combination of the number of layers for the carriers of each CA order (e.g., one string per combination). For example, if terminal device 102 supports 4CA, 5CA, 6CA, and 7CA, controller 304 may generate strings that specify all layer combinations for 4CA, strings that specify all layer combinations for 5CA, strings that specify all layer combinations for 6CA, and strings that specify all layer combinations for 7CA. Like explained in the earlier example, the 5CA string (4-4-4-2-2) indicates that terminal device 102 supports four layers on the first carrier, four layers on the second carrier, four layers on the third carrier, two layers on the fourth carrier, and two layers on the fifth carrier. Controller 304 may generate a string like this for each combination of layers that it supports for each CA order. The maximum number of layers per carrier may be equal to or less than the maximum number of antenna data streams per carrier. For example, if terminal device 102 only has four physical antennas, it may support at most four antenna data streams per carrier, and at most four layers per carrier. Terminal device 102 may be able to use more antenna data streams for a given carrier than the number of layers per carrier, such as where terminal device 102 receives the layers of a carrier with a number of antennas greater than the number of layers (e.g., for increased spatial diversity). In some aspects, controller 304 may overreport its capabilities in the capability message of stage 402. This is described in detail below for FIGS. 8-10.

After controller 304 transmits the capability message to the network in stage 402, terminal device 102 may receive the CA configuration from the network in stage 404. For example, controller 304 may receive the CA configuration via antenna system 202 and RF transceiver 204 (e.g., as a message from a network access node). The CA configuration may be an initial CA configuration or a CA reconfiguration that changes the prior CA configuration. In some aspects, the CA configuration may be any RRC or MAC signaling that indicates the CA configuration. In some cases, the CA configuration may specify the number of carriers for the configuration (e.g., 4CA, 5CA, 6CA, 7CA, and so forth) and which specific carriers are active (e.g., the frequencies of the active carriers). In some aspects, the CA configuration may be a CA reconfiguration that identifies one or more carriers that are added or removed, or one or more carriers that are activated or deactivated.

In some aspects, controller 304 may trigger resource assignment whenever it receives a CA configuration (either initial CA configurations or CA reconfigurations). Accordingly, when controller 304 receives the CA configuration in stage 404, it may trigger the resource assignment starting in stage 406. In some aspects, controller 304 may trigger resource assignment whenever it receives a CA reconfiguration that adds or removes a carrier. In other words, whenever the network adds or removes a carrier, controller 304 may evaluate the available device processing resources and active carriers and decide which carriers to assign the available device processing resources to. In some aspects, controller 304 may additionally or alternatively trigger the resource assignment whenever the network activates or deactivates a secondary cell (Scell). This is also considered a CA reconfiguration. For example, the 3GPP CA mechanism stipulates that one cell will act as a primary cell (Pcell) and one or more other cells will serve as Scells. The Pcell handles network control signaling (e.g., RRC, system information, and core network signaling) and provides a primary carrier while the Scells each provide a secondary carrier. The network may dynamically activate or deactivate Scells as needed. Thus, when the network changes the Scells, the network will transmit a CA configuration and controller 304 may trigger the resource assignment in stage 404. As further discussed below, controller 304 may additionally or alternatively trigger the resource assignment based on a timer or based on detecting asynchronous events, such as sudden changes in channel conditions or sudden changes in the scheduling of one of the carriers (e.g., when the network schedules more layers than terminal device 102 supports).

Figure 5:
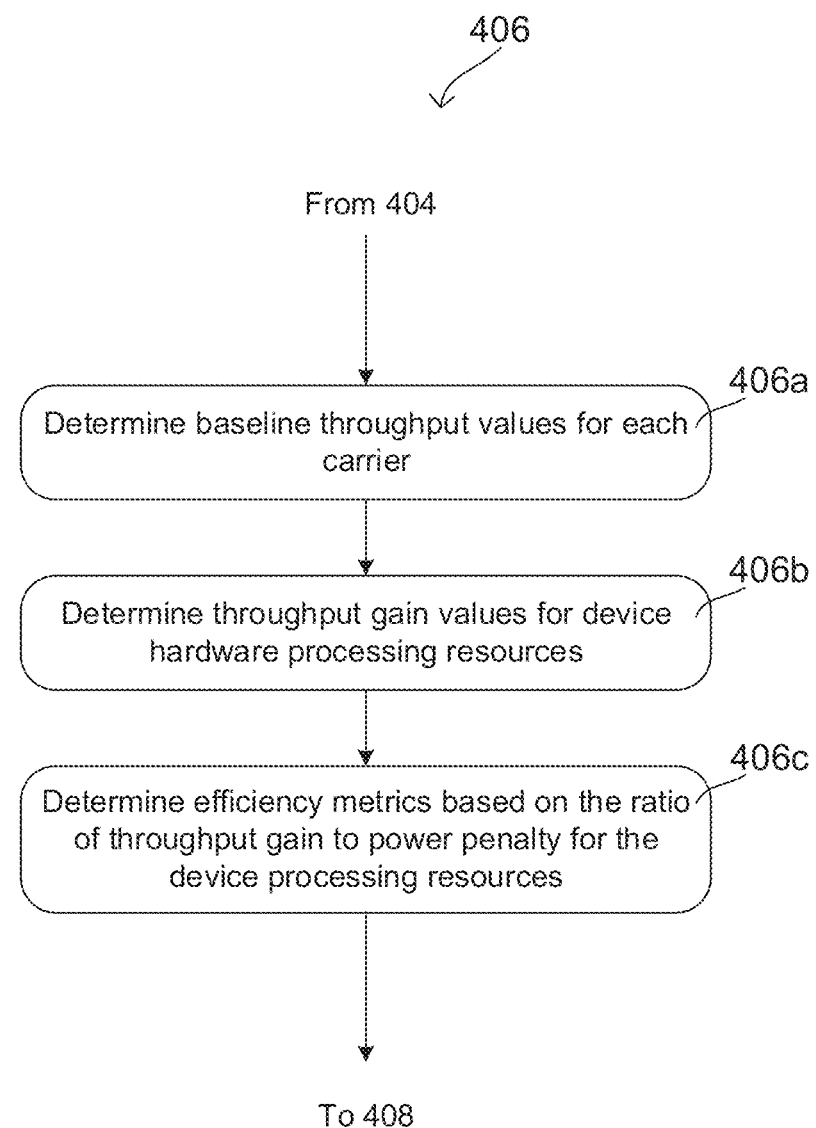
FIG. 5 shows an exemplary flow chart for determining efficiency metrics based on throughput gain and power penalties according to some aspects.

After triggering the resource assignment, terminal device 102 may determine efficiency metrics for the device processing resources for the carriers in stage 406. For example, controller 304 may identify the active carriers based on most recent CA configuration, and may instruct estimation processor 306 to determine the efficiency metrics for the device processing resources for these carriers in stage 406. FIG. 5 shows an example of stage 406 in more detail. As shown in FIG. 5, estimation processor 306 may first determine baseline throughput values for each carrier in stage 406a. These baseline throughput values may be estimates of the throughput on each carrier if controller 304 assigns a baseline level of processing hardware resources to each carrier. The baseline level of device processing resources can vary in different aspects. As previously introduced, the device processing resources include the antenna-modem pathways (equivalently the number of antenna data streams, such as two pathways/streams for 2rx, four pathways/streams for 4rx, and so forth) and advanced baseband features 310. In one example, estimation processor 306 may consider 2rx (or, another predefined minimum number of antenna data streams, such as 1rx) the baseline level of device processing resources, optionally with no advanced baseband features. Thus, in stage 406a, estimation processor 306 may determine the baseline throughput value for a first carrier by estimating the throughput for that first carrier with 2rx, determine the baseline throughput for a second carrier by estimating the throughput for that carrier with 2rx, and so forth for each of each of the carriers.

In some aspects, the baseline throughput values may be based on spectral efficiency. For example, the baseline throughput values may represent the number of bits per Hertz per unit time $$\left(\text{e.g., } \frac{\text{bits}}{\text{Hz} \cdot \text{s}}\right).$$

Accordingly, higher baseline throughput values may mean that a carrier is able to deliver higher data rates (bits per unit time) per unit frequency, and vice versa for lower baseline throughput values. This type of baseline throughput value can also be referred to as the mutual information for a carrier.

In some aspects, estimation processor 306 may determine the baseline throughput values by estimating the channel capacity for each carrier when using the baseline level of processing hardware resources (e.g., 2rx). Estimation processor 306 may, for example, determine the baseline throughput values by estimating the channel capacity based on parameters such as the maximum number of MIMO layers MaxNumLayers, the precoding gain PrecGain, the signal-to-noise ratio (SNR), the number of antenna data streams numRx, and the highest constellation order configured by the network peakMI (e.g., 6 for 64 QAM, 8 for 256 QAM). These parameters may influence the channel capacity and thus control the baseline throughput. In this example, estimation processor 306 uses the maximum number of MIMO layers and the highest constellation order, meaning that the estimate is an upper-bound.

In some aspects, estimation processor 306 may estimate the baseline throughput values I for a given carrier with the equation $$I = \text{Max}NumLayers \cdot \min\left(\log\left(1 + \frac{PrecGain \cdot SNR \cdot numRx}{\text{Max}NumLayers}\right), peakMI\right) \quad (1)$$

Here, estimation processor 306 may obtain the maximum number of MIMO layers MaxNumLayers from signaling received from the network. For example, the network may specify in the CA configuration (e.g., RRC signaling) a maximum number of MIMO layers for terminal device 102, meaning the maximum number of separate data streams the network can deliver to terminal device 102 with a shared MIMO channel on that specific carrier. If there are more MIMO layers, the baseline throughput I is generally higher. This value MaxNumLayers may also be used for other purposes, such as to adjust the number of soft bits that may be received per transport block in a transmission time interval (TTI) regardless of scheduled number of layers. Accordingly, terminal device 102 may use MaxNumLayers to some degree even when the network schedules a number of layers equal to or fewer than MaxNumLayers.

The term inside the logarithm is based on the precoding gain PrecGain, SNR, number of antenna data streams numRx, and the maximum number of MIMO layers MaxNumLayers (all specific to the carrier that estimation processor 306 is currently evaluating). This logarithm term is related to the diversity gain of the carrier. For example, if the MIMO spatial precoding is effective, the precoding gain PrecGain increases the logarithm term. Similarly, if the SNR is high, the channel reliability is also high. If terminal device 102 uses a baseline with more antenna data streams numRx than MIMO layers MaxNumLayers, then there will also higher diversity gain (since terminal device 102 receives some MIMO layers with multiple receive antennas). Because estimation processor 306 is determining the baseline throughput for a carrier assigned the baseline level of device processing resources, estimation processor 306 may plug in the number of antenna data streams numRx for that baseline level of device processing resources.

In some aspects, controller 304 may determine the precoding gain PrecGain as $$PrecGain \begin{cases} 1 & \text{if open-loop} \\ \frac{numTx}{\text{Max}NumLayers} & \text{if closed-loop} \end{cases} \quad (2)$$

where numTx is the number of transmit antennas at the network access node that transmits on the carrier. In other words, when there are more MIMO layers, the precoding gain is divided across multiple layers, decreasing the precoding gain. Conversely, if there are more transmit antennas numTx, the added redundancy can increase the precoding gain PrecGain.

In some aspects, baseband modem 206 may measure the SNR and provide the SNR measurement to estimation processor 306. Estimation processor 306 may then use that SNR measurement as the SNR when determining the baseline throughput values. For example, a digital signal processor (physical layer) of baseband modem 206 may include measurement engine 308 that is configured to perform channel measurements on received signals. Measurement engine 308 may receive signals on the carrier (via antenna system 202 and RF transceiver 204) and calculate the SNR measurement (e.g., by estimating signal power, estimating noise power, and taking the ratio of signal power to noise power). Measurement engine 308 may then provide the SNR measurement to estimation processor 306, which may use the SNR measurement to determine the baseline throughput values in stage 406a.

In some aspects, estimation processor 306 may use a polynomial approximation of the channel capacity to determine the baseline throughput values in stage 406a. For example, estimation processor 306 may use the polynomial approximation instead of directly calculating the baseline throughput values with Equation (1). In these aspects, a device engineer or manufacturer may calculate polynomial values $p_n$ offline (e.g., during manufacture or calibration, such as by using simulations or lab measurements). These polynomial values $p_n$ may be calculated for different combinations of transmission mode, numRx, numTx, and maxNumLayers. The device engineer or manufacturer may store the polynomial values $p_n$ as a lookup table in a memory of estimation processor 306. Then, when estimation processor 306 is determining the baseline throughput value I for a given carrier in stage 406a, estimation processor 306 may determine the appropriate parameters (transmission mode, numRx, numTx, and maxNumLayers) for the carrier. Estimation processor 306 may then access the lookup table and retrieve the correct polynomial values $p_n$ mapped to those parameters. Estimation processor 306 may identify the SNR (e.g., retrieve an SNR measurement from measurement engine 308) and determine the baseline throughput value based on the polynomial values $p_n$ and the SNR. For example, estimation processor 306 may determine the baseline throughput value I for the carrier by calculating $$I = \min\left(\sum_{n=0}^{N} p_n \cdot SNR^n, peakMI\right) \quad (3)$$

where N is the number of polynomials computed offline for approximating the baseline throughput value.

In some aspects, estimation processor 306 may blindly estimate a given baseline throughput value I when the device processing resource is not yet activated. For example, estimation processor 306 may define the estimate as an upperbound as the achievable throughput (or throughput gain) with the information available at the time of computation. In one example, 4rx may not yet be activated on a given carrier. When determining I for 4rx on that carrier, estimation processor 306 may assume a minimal imbalance between the antennas and/or a low correlation between them.

Figure 6:
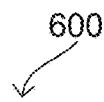
FIG. 6 shows an exemplary table including baseline throughput values and throughput gain values according to some aspects.

In addition to the baseline throughput values, estimation processor 306 may also determine throughput gain values for the device processing resources for the carriers. As FIG. 5 shows, estimation processor 306 may determine the throughput gain values in stage 406b. While the baseline throughput values approximated the carriers' throughputs with a baseline level of device processing resources, the throughput gain values approximate the improvement to the throughput if a specific device processing resource were assigned to that carrier. FIG. 6 shows exemplary table 600 illustrating the baseline throughput values and throughput gain values according to some aspects. While FIG. 6 uses 7CA as an example, other cases may use any CA order. As shown in FIG. 6, estimation processor 306 may determine baseline throughput values for each of the seven carriers C0-C7, such as by using the estimated channel capacity equation or polynomial approximation. Using carrier C0 (a first carrier) as an example, estimation processor 306 may then approximate how much the carrier C0's throughput would increase if each of the device processing resources (e.g., device processing resources A-D) were assigned to carrier C0. To do so, estimation processor 306 may, for example, determine the adjusted throughput value for carrier C0 if device processing resource A (a first device processing resource) were assigned to it. For instance, estimation processor 306 may re-calculate throughput value I (with the estimated channel capacity equation or polynomial approximation) with the input parameters for device processing resource A. If the baseline level is 2rx and device processing resource A is 4rx, then estimation processor 306 may determine adjusted throughput value I with 4rx instead of 2rx (numRx=4). If the baseline level is 2rx and device processing resource B is an interference cancellation feature (or, any of advanced baseband features 310 that provide an SNR increase), estimation processor 306 may determine the adjusted throughput value by adding an SNR increase to the SNR measurement and then use the channel capacity equation or polynomial approximation, where the SNR increase is the estimated boost in SNR from using that interference cancellation feature. Because the device processing resources are used with the baseline level of processing resources, the adjusted throughput values may estimate the throughput when both the baseline level of device processing resources and a device processing resource are assigned to a given carrier. In some aspects, estimation processor 306 may estimate the throughput gain value (discussed below in detail) for advanced baseband features based on offline gain expectations. For instance, estimation processor 306 may be programmed in advance with the throughput gain values for certain advanced baseband features, and may not use the same channel capacity equation or polynomial approximation to determine the adjusted throughput values for these advanced baseband features. Depending on what device processing resources C and D are (e.g., other numRx values or other advanced baseband features 310), estimation processor 306 may similarly determine their adjusted throughput values.

Estimation processor 306 may then determine the throughput gain values based on the baseline throughput values and the adjusted throughput values. Using carrier C0 as an example, estimation processor 306 may determine the throughput gain value for each of device processing resources A-D as the ratio (or, equivalently, percentage) of the adjusted throughput value to the baseline throughput value. Using FIG. 6 as an example, if carrier C0's baseline throughput value is 40, estimation processor 306 may determine that device processing resource A (e.g., increasing the number of antenna data streams, such as from 2rx to 4rx) would improve that baseline throughput value by 20%. This means the throughput gain value is 20%. Similarly, estimation processor 306 may determine that device processing resource B would improve the baseline throughput value by 0%. This throughput gain value of 0% may mean that device processing resource B is ineffective on carrier C0, or that device processing resource B is incompatible with carrier C0. Estimation processor 306 may determine throughput gain values for each of device processing resources A-D (e.g., the device processing resources available for controller 304 to assign) for carrier C0. Estimation processor 306 may similarly determine throughput gain values for each of device processing resources A-D for the remaining carriers C1-C7. As discussed above, in some aspects estimation processor 306 may be preconfigured with the throughput gain values for certain device processing resources (e.g., advanced baseband features 310, such as based on offline gain expectations). Thus, estimation processor 306 may determine the throughput gain values for these device processing resources by retrieving the throughout gain values from its memory.

After determining the throughput gain values in stage 406b, estimation processor 306 may determine efficiency metrics for the device processing resources in stage 406c. Each efficiency metric may be based on a hypothetical pairing of a given device processing resource to a specific carrier. For example, estimation processor 306 may determine an efficiency metric for each device processing resource (e.g., A-D) for a first carrier (e.g., C0), where the efficiency metrics estimate the ratio of throughput gain to power penalty from using a respective device processing resource on the first carrier. Using carrier C0 and device processing resource A as an example, estimation processor 306 may determine the efficiency metric by dividing the throughput gain value (e.g., 20% in FIG. 6) by the power penalty for device processing resource A. In some aspects, estimation processor 306 may be preconfigured with power penalty values for the device processing resources, or may be configured to estimate the power penalty values for the device processing resources based on runtime operating conditions (e.g., by monitoring power usage at an earlier time when the device processing resources are active). The power penalty values may approximate the increase in power usage (e.g., a ratio) that would be caused from using a given device processing resource with a particular carrier. Thus, when calculating the efficiency metric for carrier C0 and device processing resource A, estimation processor 306 may divide the throughput gain value by the power penalty value and take the result (a ratio) as the efficiency metric. Estimation processor 306 may similarly determine efficiency metrics for the remaining device processing resources for each of the remaining carriers.

In some aspects, estimation processor 306 may determine the efficiency metrics by scaling the ratio of throughput gain to power penalty by the carrier bandwidth, the frequency scheduling rate of the carrier (e.g., an average percentage of the carrier bandwidth that the network assigns to terminal device 102), and/or a time scheduling rate of the carrier (e.g., an average percentage of time that the network assigns to terminal device 102). In one example, estimation processor 306 may determine the efficiency metric $W_{i,j}$ for an i-th device processing resource on a j-th carrier by calculating $$W_{i,j} = \frac{\Delta T_{i,j}}{\Delta P_{i,j}} \cdot B_j \cdot \partial F \cdot \partial T \qquad (4)$$

where $\Delta T_{i,j}$ is the throughput gain value for the i-th device processing resource on the j-th carrier, $\Delta P_{i,j}$ is the power penalty, $B_j$ is the carrier bandwidth, $\partial F$ is the frequency scheduling rate, and $\partial T$ is the time scheduling rate. In some aspects, estimation processor 306 may determine $\partial F$ and $\partial T$ by measuring the frequency and time scheduling rates over a time interval.

By scaling the ratio/percentage of throughput gain to power penalty by carrier bandwidth $B_j$, estimation processor 306 may base the efficiency metric $W_{i,j}$ on how much bandwidth the carrier has. Accordingly, wider carriers can generally carry more data and may thus have higher efficiency metrics. This means that controller 304 will be more likely to assign device processing resources to wider carriers. Similarly, if the network regularly allocates a large number of resource blocks to terminal device 102 on a carrier, the frequency scheduling rate OF will be larger. The efficiency metric $W_{i,j}$ will thus be larger, and controller 304 may be more likely to assign device processing resources to that carrier. Likewise, if the network frequently allocates downlink resources to terminal device 102 on a carrier, the time scheduling rate OT will be larger. The efficiency metric $W_{i,j}$ will thus be larger, and controller 304 may be more likely to assign device processing resources to that carrier.

The efficiency metrics $W_{i,j}$ may therefore reflect various competing factors. For example, some device processing resources may be expected to produce a large throughput gain (e.g., large $\Delta T_{i,j}$) on a given carrier. However, if these device processing resources are power-hungry, the large power penalty value $\Delta P_{i,j}$ will bring down the efficiency metric $W_{i,j}$.

Estimation processor 306 may thus determine efficiency metrics for the device processing resources and the carriers in stage 406c. In some aspects, estimation processor 306 may determine an efficiency metric $W_{i,j}$ for each j-th device processing resource (e.g., each of a plurality of device processing resources that terminal device 102 supports) and each i-th carrier (e.g., each of a plurality of carriers that the network activated in the CA configuration). Each efficiency metric may correspond to a carrier-device processing resource pair (e.g., representing the assignment of that device processing resource to that carrier). After determining the efficiency metrics, estimation processor 306 may provide the efficiency metrics to controller 304. This may complete stage 406 in FIG. 4.

Controller 304 may then assign device processing resources to carriers based on the efficiency metrics in stage 408. As explained above, the efficiency metric for a given device processing resource may approximate a ratio of throughput gain to power penalty from assigning the device processing resource to a specific carrier. In some aspects, controller 304 may assign the device processing resources to carriers based on a sum of the efficiency metrics of the assignments. For example, controller 304 may assign the device processing resources to carriers based on maximizing the sum of the efficiency metrics. This type of problem generally falls in the field of combinatorial optimization, where controller 304 may attempt to assign device processing resources to carriers so that the sum of the efficiency metrics (the efficiency metrics that map to the assigned resource-carrier pairs) is maximized. This problem can be represented as $$\max_i \sum_j W_{i,j} \qquad (5)$$

or in other words, maximizing the sum of the efficiency metrics $W_{i,j}$ of each assigned resource-carrier pair. Because the efficiency metrics are based on the ratio of throughput gain to power penalty, maximizing this sum can be an optimal tradeoff between the increased throughput across all j carriers versus the increase in power consumption. The sum of efficiency metrics may be a utility function that controller 404 attempts to optimize through assigning device processing resources to carriers.

Depending on the number of carriers and available device processing resources, the number of possible resource-carrier assignments can be very large. As used herein, a resource-carrier assignment is a combination of pairings between device processing resources and carriers (where each resource-carrier pair represents assigning the device processing resource to the carrier). While possible, brute force searches to check the sum of each possible resource-carrier assignment may be computationally unrealistic. Accordingly, in some aspects controller 304 may be configured to use a combinatorial optimization technique to try to identify a resource-carrier assignment that maximizes the sum of efficiency metrics.

Figure 7:
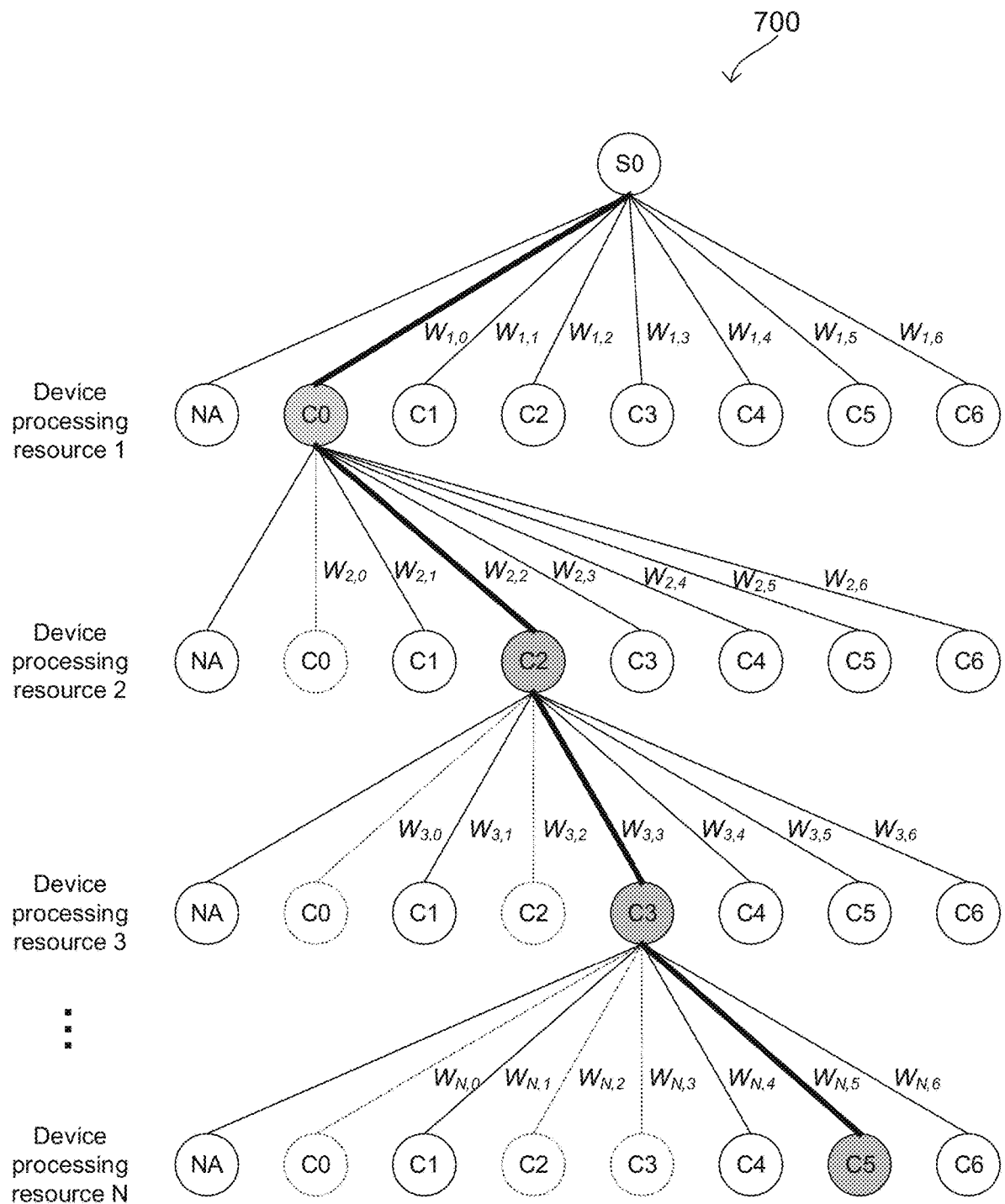
FIG. 7 shows an example of tree search for assigning device processing resources to carriers according to some aspects.

To consider all of the different possible resource-carrier assignments, the search can be visualized as a tree. The root node of the tree is the solution where only the baseline level of device processing resources (baseline) is assigned to each carrier. Each level down the tree then represents assigning a particular device processing resource to a specific carrier. Each edge in the graph is assigned to the corresponding efficiency metric $W_{i,j}$ that represents the ratio of throughput gain to power penalty from assigning the particular device processing resource to the specific carrier. FIG. 7 shows exemplary tree chart 700 illustrating this concept according to some aspects. As shown in FIG. 7, in this example controller 304 may assign N device processing resources (the plurality of device processing resources) to seven carriers (e.g., a plurality of carriers, such as for a 7CA scheme). Estimation processor 306 may have previously provided the efficiency metrics $W_{i,j}$ (for each pair of N device processing resources and each of the 7 carriers) to controller 304. Controller 304 may initialize a sum utility function S0 as $C0=(d_0,p_0)$ (the initial throughput do and initial power usage $p_0$; this is the baseline efficiency metric) and then select, based on the efficiency metrics $W_{i,j}$, device processing resources to assign to the carriers.

In some aspects, controller 304 may assign the device processing resources to the carriers based on a greedy search. For example, using a digital data representation of the tree, controller 304 may traverse the tree top-to-bottom. Each level of the tree corresponds to one of device processing resources. As FIG. 7 shows, each level of the tree contains a plurality of nodes representing the possible choices for assigning the device processing resource of that level of the tree. One of the nodes (marked "NA") represents not assigning the device processing resource to any carrier. The remaining nodes (one per carrier) represent assigning the device processing resource to a specific carrier. Thus, controller 304, at each level of the tree, select the node that maximizes the sum of the efficiency metrics connecting that node to the root (S0). Since each node represents a specific efficiency metric $W_{i,j}$ for a resource-carrier pair, controller 304 may, for each selected node, assign the corresponding j-th device processing resource to the i-th carrier. Thus, controller 304 may assign device processing resources to carriers by selecting nodes. If, for example, none of the carriers can make use of a particular device processing resource, controller 304 may not assign that device processing resource to any of the carrier ("NA" node).

In the example of FIG. 7, controller 304 may assign device processing resource 1 to carrier C0, device processing resource 2 to carrier C2, device processing resource 3 to carrier C3, and device processing resource 4 to carrier C4. In this example, controller 304 may assign a maximum of one device processing resource to a given carrier. In other aspects, controller 304 may assign more than one device processing resource to a given carrier (e.g., depending on the efficiency metrics). As noted above, in some aspects one or more of device processing resources 310 may be configured to process multiple carriers concurrently. Accordingly, controller 304 may be configured to assign those device processing resources to multiple carriers.

The greedy search technique described above is only one example of how controller 304 can assign device processing resources to carriers to maximize a sum of the efficiency metrics (or another utility function). As mentioned above, combinatorial optimization has developed numerous techniques that can identify combinations of elements to maximize a utility function. Controller 304 may use any such technique in stage 408. As those techniques are not the focus of this disclosure, this disclosure does not describe each technique in full.

In some aspects, controller 304 may use additional criteria when attempting to find an optimal resource-carrier assignment from the solution space. For example, the device processing resources may be grouped together in clusters, such as where advanced baseband features 310 are grouped in clusters on separate chips or sections of a chip. It may therefore be more power-efficient to the active advanced baseband features in the same cluster, since the other clusters can be completely shut down. Accordingly, controller 304 may assign device processing resources to carriers based on activating the fewest number of clusters. This may have a power advantage, and thus a lower power penalty, over resource-carrier assignments that spread carriers or features to more clusters.

In another example of additional criteria, some resource-carrier assignments may have higher performance than others. For example, some device architectures for terminal device 102 may have performance penalties when controller 304 changes the resource-carrier assignment. For example, controller 304 may have previously performed an assignment in stage 408 during an earlier iteration of the resource assignment. When controller 304 changes that prior resource-carrier assignment to a new one, terminal device 102 may need to re-route the carriers' data streams to newly assigned device processing resources (e.g., routing antenna data streams to more or less antenna-modem pathways or routing antenna data streams to certain advanced baseband features). There may be a performance penalty for this re-routing, and terminal device 102 may even lose data it executes the re-routing. Thus, in some aspects controller 304 may assign device processing resources to carriers based on minimizing the number of changes with respect to the last resource-carrier assignment. In one example using FIG. 3, controller 304 may assign device processing resources to carriers based on minimizing the distance between nodes of the last resource-carrier assignment and the new resource-carrier assignment. This can be particularly relevant when terminal device 102 cannot reconfigure the resource-carrier assignments (e.g., re-routing antenna-modem pathways and/or mapping data streams to advanced baseband features) seamlessly. If that is the case, downlink and/or uplink reception/transmission may be interrupted for, e.g., several milliseconds until terminal device 102 finishes the reconfiguration. Minimizing the number of changes can help mitigate those issues.

In a third example of additional criteria, some network access nodes may not expect rapid spikes or drops in performance. For example, a network access node's link adaptation algorithm may react poorly when a terminal device's throughput on one carrier suddenly jumps or drops (e.g., sudden changes in throughput caused by sudden jumps or falls in receiver performance). Accordingly, even if controller 304 determines a new resource-carrier assignment that should have a boost in performance, the network access node's behavior may dampen the performance boost. In some aspects, therefore, controller 304 may assign device processing resources to carriers based on avoiding large jumps (e.g., avoiding jumps in throughput of more than a predefined threshold) in performance. In some cases, controller 304 may do this if overall throughput (e.g., summed across all carriers) does not proved a significant advance with a new resource-carrier assignment.

By executing stage 408, controller 304 may therefore select which device processing resources to assign to the different carriers. This yields a resource-carrier assignment, which is a dataset including the various pairings of device processing resources to carriers (e.g., according to which device processing resources maximized the utility function). Once controller 304 obtains this resource-carrier assignment, controller 304 may determine a sequence of operations for configuring terminal device 102 to carry out the resource-carrier assignment. In other words, terminal device 102 may route the different antenna ports of antenna system 202 to the antenna-modem pathways based on the number of antenna data streams assigned to each carrier (e.g., so the various carriers have the assigned number of antenna data streams delivered to baseband modem 206). Terminal device 102 may also route the antenna data streams to advanced baseband features 310 based on the advanced baseband features (if any) assigned to each carrier (e.g., so the various carriers are processed by the assigned advanced baseband features). As part of stage 408, controller 304 may determine the sequence of operations to carry out this routing (and, for example, any startup or initialization processes, such as to initialize advanced baseband features 310). Controller 304 may then execute the sequence of operations. This may configure terminal device 102 to receive data according to the resource-carrier assignment.

Terminal device 102 may then receive on the carriers with the respectively assigned device processing resources in stage 410. For example, controller 304 may have configured terminal device 102 according to the resource-carrier assignment in stage 408. Terminal device 102 may therefore receive data on the carriers using that resource-carrier assignment. For example, controller 304 may control RF transceiver 204 to receive with antenna system 202 on the assigned number of antennas (numRx) for each carrier. For example, if controller 304 assigned 4rx to a first carrier, RF transceiver 204 may use antenna system 202 to receive signals with four antennas. This produces four antenna data streams for the first carrier. Or, in another example, if controller 304 assigned 2rx to the first carrier, RF transceiver 204 may use antenna system 202 to receive signals with two antennas. This may include demodulating the received antenna signal for each assigned antenna with the carrier frequency of the first carrier, thus producing an antenna data stream for the first carrier from each assigned antenna. As a result, RF transceiver 204 may receive the assigned number of antenna data streams for each carrier.

RF transceiver 204 may then send these antenna data streams to modem 204. Baseband modem 206 may then route the antenna data streams to advanced baseband features 310, e.g., depending on which of advanced baseband features 310 were assigned to which carriers. Advanced baseband features 310 may then process the antenna data streams for their assigned carriers. Baseband modem 206 may perform additional processing (e.g., physical layer and/or protocol stack processing) on the received data for each carrier, such as to receive and decode control and user data.

Thus, in stage 410 terminal device 102 may carry out the resource-carrier assignment that controller 304 determined in stage 408. After terminal device 102 has received data with the resource-carrier assignment in stage 410, terminal device 102 may evaluate performance and decide whether to release any device processing resources in stage 412. For example, as discussed above controller 304 determines the resource-carrier assignment based on estimates of the throughput gain and power penalty. These estimates may also be upper-bound estimates. Because the resource-carrier assignment is based on an optimistic approximation, it can be advantageous for controller 304 to evaluate the actual performance of the resource-carrier assignment, such as with runtime measurements on the channel and interference conditions. Based on those measurements, controller 304 may determine whether any of the assigned device processing resources can be released.

Accordingly, in stage 412 controller 304 may determine throughput gain measurement for each resource-carrier pair. For instance, measurement engine 308 may perform measurements on the antenna data streams for each carrier (each j-th carrier) and may measure the throughput for each carrier. Measurement engine 308 may provide this throughput measurement to controller 304, which may then determine the throughput gain measurement $\Delta T'_{i,j}$ (for adding the i-th device processing resource to the j-th carrier) as the ratio of the throughput measurement to the baseline throughput value (from stage 406). In another example, measurement engine 308 may perform a channel measurement, such as an SNR measurement, on the antenna data stream for each j-th carrier. Measurement engine 308 may provide that channel measurement to estimation processor 306. Estimation processor 306 may then determine the throughput measurement by inserting the channel measurement into Equation (1) or (3) above (e.g., as the SNR field). Estimation processor 306 may provide the resulting throughput measurement to controller 304, which may then determine the throughput gain measurement $\Delta T'_{i,j}$ as the ratio of the throughput measurement to the baseline throughput. The throughput gain measurement $\Delta T'_{i,j}$ may thus be the measurement throughput increase from using the i-th device processing resource on the j-th carrier.

In some aspects, controller 304 may also determine a power penalty measurement for each resource-carrier pair. For example, controller 304 may measure the power usage from the i-th device processing resource assigned to the j-th carrier. Controller 304 may determine the power penalty measurement $\Delta P'_{i,j}$ as the ratio of the power penalty measurement to the baseline power usage for the i-th device processing resource. In other aspects, controller 304 may use preconfigured power penalty values for the device processing resources as the power penalty measurement $\Delta P'_{i,j}$. The power penalty measurement $\Delta P'_{i,j}$ may thus be the power usage increase from using the i-th device processing resource on the j-th carrier.

Using the throughput gain measurements $\Delta'_{i,j}$ and power penalty measurements $\Delta P'_{i,j}$, controller 304 may determine a measured efficiency metric gain $\Delta W'_{i,j}$. For example, controller 304 may determine measured efficiency metric gain $\Delta W'_{i,j}$ (for the i-th device processing resource and j-th carrier) as $\Delta W'_{i,j}$ $$\Delta W'_{i,j} = \frac{\Delta T'_{i,j}}{\Delta P'_{i,j}} \tag{6}$$

Controller 304 may then determine whether to release device processing resources from carriers based on the measured efficiency metric gain $\Delta W'_{i,j}$. For example, the efficiency metric gain $\Delta W'_{i,j}$ for a given resource-carrier pair may be the gain in efficiency metric for having the device processing resource activated on the carrier. Controller 304 may compare the measured efficiency metric gain $\Delta W'_{i,j}$ to a threshold $\Delta Th$ (e.g. $\Delta Th=1$ means that resource will be disabled if energy efficiency is higher by releasing the resource previous assigned to the carrier). If the measured efficiency metric gain $\Delta W'_{i,j}$ is less than the threshold Th, controller 304 may decide to release the device processing resource from the carrier in stage 412. This can happen, for example, when the device processing resource is providing less throughput than initially estimated, and/or is using more power than initially estimated. Otherwise, controller 304 may keep the device processing resource on the carrier. In some aspects, controller 304 may perform this comparison between efficiency metrics and deactivated efficiency metrics for each device processing resource assigned to a carrier.

Accordingly, controller 304 may decide whether to release device processing resources from carriers based on whether the assigned device processing resources optimize the utility function. As explained here, controller 304 may examine each carrier individually when deciding whether to release a device processing resource. This is different than the approach used to assign device processing resources in stage 408, which tried to optimize the utility function across all carriers. As Equation (6) expresses, controller 304 looks at a more restricted choice: whether or not releasing a device processing resource from a given carrier would increase or decrease the utility function (e.g., the sum of efficiency metrics). If release would increase the utility function, controller 304 may release the device processing resource. Compared to Equation (4), which scaled the ratio of throughput gain to power penalty by the carrier bandwidth and time and frequency scheduling rates, Equation (6) only depends on the throughput gain and power penalty. Accordingly, instead of prioritizing some carriers over others (based on their relative bandwidths and scheduling rates), controller 304 may only focus on one carrier at a time when deciding to release device processing resources. Additionally, while Equation (4) was based primarily on optimistic approximations, Equation (6) uses actual measurements from when the device processing resources are actually activated. If device processing resources were initially assigned based on unrealistically optimistic estimates, controller 304 may release those device processing resources in stage 412 based on their actual performance.

If applicable, controller 304 may thus release device processing resources from certain carriers in stage 412. Because some of the resource-carrier pairs are released, the resource-carrier assignment may be an updated resource-carrier assignment (including only the resource-carrier pairs that were not released). Terminal device 102 may continue receiving on the carriers in stage 414 but may use the updated resource-carrier assignment. If, for example, controller 304 releases a device processing resource that is a number of antenna-modem pathways for a first carrier (e.g., reverting from 4rx to baseline 2rx), terminal device 102 may receive data on the first carrier with less antennas than with the original resource-carrier assignment (e.g., with two antenna data streams instead of four). If, for example, controller 304 releases a device processing resource that is an advanced baseband feature for a first carrier (e.g., deactivates interference cancellation for the first carrier), terminal device 102 may receive data on the first carrier but not process that data with the released advanced baseband feature.

Terminal device 414 may continue receiving on the carriers until a timer expires in stage 416. After the timer expires, terminal device 414 may repeat stages 406-414 to determine and use a new resource-carrier assignment. As previously explained above, reassigning device processing resources may have performance drawbacks. For example, re-routing antenna data streams to different antenna-modem pathways and/or advanced baseband features may take time and cause data loss in the interim. Thus, it can be disadvantageous for terminal device 102 to re-assign device processing resources too often. Terminal device 102 may therefore use the timer in stage 416 to trigger reassignment. In some aspects, controller 304 may start the timer at stage 406, thus using the timer to control the duration of time between reassignments. Then, when controller 304 determines the timer expires in stage 416, controller 304 may return to stage 406. Terminal device 102 may then determine and use a new resource-carrier assignment in stages 406-414. For example, measurement engine 308 may perform new channel measurements, and estimation processor 306 may determine new efficiency metrics based on those channel measurements. Because the new efficiency metrics are different, controller 304 may select a different resource-carrier assignment in stage 410. Terminal device 102 may repeat this procedure each time the time expires in stage 416. As previously indicated, controller 304 may also trigger reassignment if the network sends a new CA configuration (e.g., a CA reconfiguration).

In some aspects, controller 304 may use an adaptive timer in stage 416. For example, controller 304 may determine an adaptive timer length based on the number of subframes that were interrupted during reassignment. For instance, if the rerouting and configuration needed for the reassignment in stage 408 and 410 caused X subframes to be lost, controller 304 may set the adaptive timer length based on X In one example, controller 304 may set the adaptive timer to be longer if X is higher, and to be shorter if X is lower. Thus, when reassignment causes a long interruption, controller 304 may wait for a longer period of time before triggering another reassignment. This can help terminal device 102 comply with certification body standards. For example, the 3GPP and other certification bodies may require that block error rate (BLER) to be less than a threshold amount in clean channel conditions. Since reassignment leads to data loss and a lower BLER, controller 304 may set the adaptive timer so the BLER remains above the BLER threshold amount. The adaptive timer may thus help to maintain BLER above a threshold amount.

As FIG. 4 shows, in some aspects terminal device 102 may also trigger reassignment based on asynchronous events in stage 418. For instance, in some scenarios the channel conditions may suddenly change, such as when terminal device 102 enters or exits a building. Accordingly, the channel measurements that controller 304 previously used to assign device processing resources may become outdated. Controller 304 may therefore also trigger reassignment when there is a sudden change in channel conditions. In one example, measurement engine 308 may periodically provide channel measurements (e.g., SNR or another channel metric) to controller 304, such as where measurement engine 308 performs a measurement each time a sleep timer expires in 420. Controller 304 may then compare the new channel measurement with the previous channel measurement (e.g., the channel measurement on which the current resource-carrier assignment is based). If the new channel measurement is greater or less than the previous channel measurement by more than a predefined threshold, controller 304 may trigger a reassignment (e.g., based on detecting an asynchronous event). Terminal device 102 may then proceed to stage 406. If the new channel measurement is not greater or less than the previous channel measurement by more than the predefined threshold, controller 304 may not trigger a reassignment (but may still trigger a reassignment based on a new CA configuration in stage 404 and/or timer expiry in stage 416). Measurement engine 308 may provide another new measurement after the sleep timer expires, and controller 304 may then decide whether to trigger reassignment by comparing that newest measurement to the previous channel measurement (e.g., the same channel measurement on which the current resource-carrier assignment is based). In some aspects, controller 304 may also limit the number of asynchronous-triggered reassignments in a predefined interval of time. For example, controller 304 may permit up to Y asynchronous-triggered reassignments in any given window of time of a predefined length, but may ignore asynchronous-triggered reassignments if their number reaches Y over any window of the predefined length. This may also help to maintain the BLER.

In some aspects, controller 304 may also use sudden changes in carrier scheduling as an asynchronous event. For example, if the network sends a scheduling message that indicates downlink transmission of more layers on a given carrier than the number of active antennas terminal device 102 has on that carrier (e.g., the number of active antennas from which terminal device 102 currently is routing data to baseband modem 206). This case is discussed in detail in FIG. 10.

Using the techniques described above, terminal device 102 may efficiently assign the available device processing resources to carriers. As discussed, terminal device 102 may base this assignment on efficiency metrics that depend on the estimated throughput gain and power penalty of assigning various device processing resources to different carriers. Terminal device 102 may therefore improve throughput without excessively sacrificing battery power.

Additionally, as introduced above terminal device 102 may also overreport its capabilities to the network in stage 402. Terminal device 102 may then dynamically reassign device processing resources to meet the resulting CA mode scheduled by the network. This may help to reduce signaling overhead. For example, like described above controller 304 may send a capability message to the network in stage 402. This capability message may specify the number of layers that terminal device 102 supports on each carrier of each CA configuration. The capability message may include a set of strings for each CA order (number of carriers), where each string in a set identifies the number of layers supported for each carrier of the CA order. This disclosure uses the term CA mode to mean the number of layers that the network schedules over all active carriers simultaneously. For example, one exemplary CA mode for 4CA would be where the network schedules four layers for each of the four carriers; another exemplary CA mode for 4CA would be where the network schedules two layers for two carriers and four layers for the remaining two carriers. Since each string identifies how many layers terminal device 102 supports on each of the carriers of a given CA order, each string identifies a CA mode that terminal device 102 supports. The network may schedule a CA mode by sending scheduling messages to terminal device 102. In some aspects, the network may send a separate scheduling message (e.g., downlink control information (DCI)) to terminal device 102 on each carrier. Each separate scheduling message may specify the number of layers (rank) scheduled for downlink transmission on that carrier, and controller 304 may read the scheduling messages to determine the rank for each carrier. In other aspects, the network may send one or more scheduling messages that specify the rank for multiple of the carriers, such as where the network sends terminal device 102 a scheduling message on a primary carrier that specifies the respective ranks for the primary carrier and one or more additional carriers. The overall set of ranks scheduled for each active carrier in a CA configuration is referred to as a CA mode.

Figure 8:
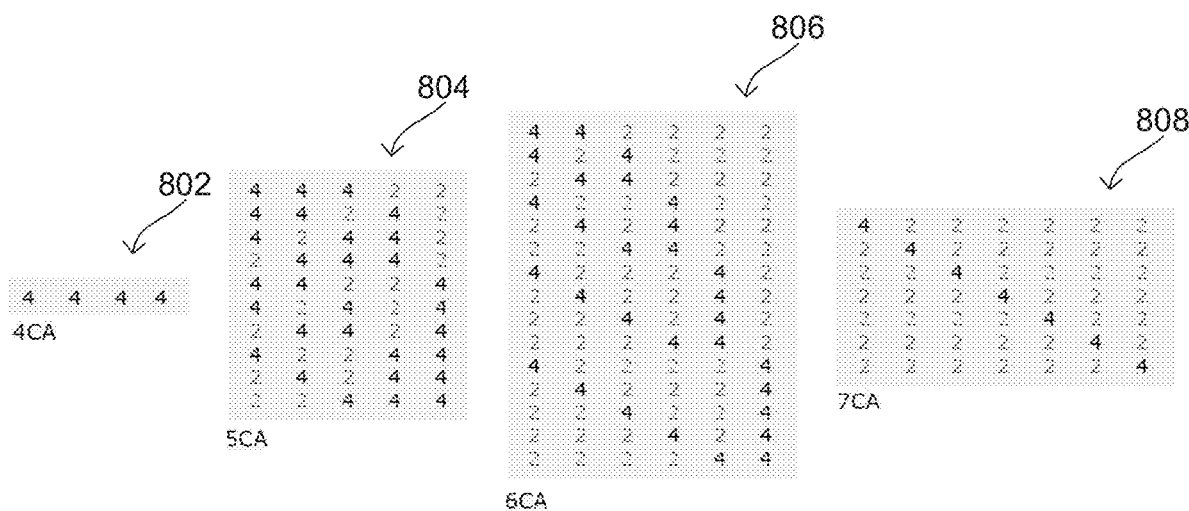
FIG. 8 shows examples of capability messages for carrier aggregation according to some aspects.

FIG. 8 shows exemplary contents of a capability message according to some aspects. As shown in FIG. 8, the capability message may include string sets 802, 804, 806, and 808. Each of string sets 802-808 may include strings that respectively specify one CA mode that terminal device supports (for the carrier aggregation connection between terminal device 102 and the network). In this example, terminal device 102 may support 16 total antenna data streams. Thus, for 4CA, the capability message may specify that terminal device 102 supports four layers on each of the four carriers (e.g., the maximum number of layers for the carrier aggregation connection in this example). For 5CA, terminal device 102 may not be configured to support the maximum number of layers for each carrier. For instance, receiving the maximum number of layers on each of five carriers would use 20 antenna data streams, but terminal device 102 only supports 16 antenna data streams. Thus, string set 804 may include a first string indicating four layers for carriers 1-3 and two layers for carriers 4 and 5 (a first CA mode); a second string indicating four layers for carriers 1-2 and 4 and two layers for carriers 3 and 5 (a second CA mode); a second string indicating four layers for carriers 1, 3, and 4, and two layers for carriers 2 and 5 (a third CA mode); and so forth (e.g., through each possible distribution of 16 antenna data streams among five carriers). Similarly, string set 806 may include strings that indicate each possible distribution of 16 antenna data streams over six carriers, and string set 808 may include strings that indicate each possible distribution of 16 antenna data streams over seven carriers.

Because the capability message indicates each possible CA mode (layers per carrier) for each possible CA order, the capability message can be very large in size. As new standards increase the highest supported CA orders, the capability messages will continue to become larger. This problem may become even more complex in practice, since an actual implementation may also consider factors like contiguous/non-contiguous carriers, and certain low/medium/high bands where not all bands can do 4rx (e.g., since 4rx in low band may not be allowed due to lack of physical space for distance between antennas). The capability messages may thus contribute to significant control signaling overhead. Additionally, in some cases the CA mode strings may be computed offline and loaded into internal lookup tables of the baseband modem. The excessive number of strings may therefore require more memory. Furthermore, because the strings are predefined, a terminal device may not be able to control the CA mode based on other parameters like SNR, correlation, antenna imbalances, and so forth.

Accordingly, in some aspects terminal device 102 may overreport its capabilities in the capability message. For example, terminal device 102 may signal to the network that it can support more layers that it is actually configured to support (e.g., more total layers than the total number of supported antenna data streams). Terminal device 102 may, for instance, indicate in the capability message that it can support the maximum number layers for each carrier. In an example where 2rx and 4rx are the options for antenna data streams, terminal device 102 may indicate that it can support four layers on each carrier. Thus, terminal device 102 may indicate it can support more total layers than it actually can (e.g., the total number of layers for each carrier of at least one CA configuration exceeds the total number of supported antenna data streams).

Figure 9:
FIG. 9 shows examples of overreported capability messages for carrier aggregation according to some aspects.

FIG. 9 shows exemplary contents of an overreported capability message according to some aspects. In this example, the maximum number of layers per carrier may be four, and the total number of supported antenna data streams may be 16. As FIG. 9 shows, controller 304 may generate the capability message to specify the maximum number of layers on each carrier for each CA order. For instance, controller 304 may include in the capability message a string set 902 including a single string for 4CA. That single string specifies that terminal device 102 supports four layers (the maximum number of layers per carrier) on each of the four carriers. The capability message may also include a string set 904 for 5CA that specifies that terminal device 102 supports four layers on each of the five carriers. Because this adds up to 20 layers while the total number of supported antenna data streams is only 16, the capability message may overreport terminal device 102's capabilities (e.g., may indicate CA modes that terminal device 102 cannot actually support). Similarly, with string set 906 controller 304 may generate the capability message to indicate that terminal device 102 supports four layers on each of the six carriers. This adds up to 24 layers, and is thus also overreporting. Controller 304 may similarly overreport its 7CA capabilities with string set 908.

The number of strings and overall size of the capability message in FIG. 9 are considerably less than those for the capability message in FIG. 8. Accordingly, terminal device 102 can reduce signaling overhead and/or memory usage by overreporting its capabilities. While in this example controller 304 signals the maximum number of layers, in other scenarios controller 304 may overreport without signaling the maximum number of layers per carrier. For instance, in another example the maximum number of layers may be 8. Controller 304 may then overreport its capabilities with string sets 902-908 (e.g., signaling four layers for each carrier). Even though controller 304 did not specify the maximum number of layers per carrier, controller 304 may still reduce control signaling overhead and/or memory usage with this overreporting. Additionally, some carriers may support different maximum numbers of layers, such as where some carriers support, e.g., four layers while others only support two layers. In an example based on FIG. 9, the first carrier may only support two layers while the other carriers support four layers. Because the overreporting of four layers is done based on the individual carrier capability, overreporting would not apply for the first carrier.

Figure 10:
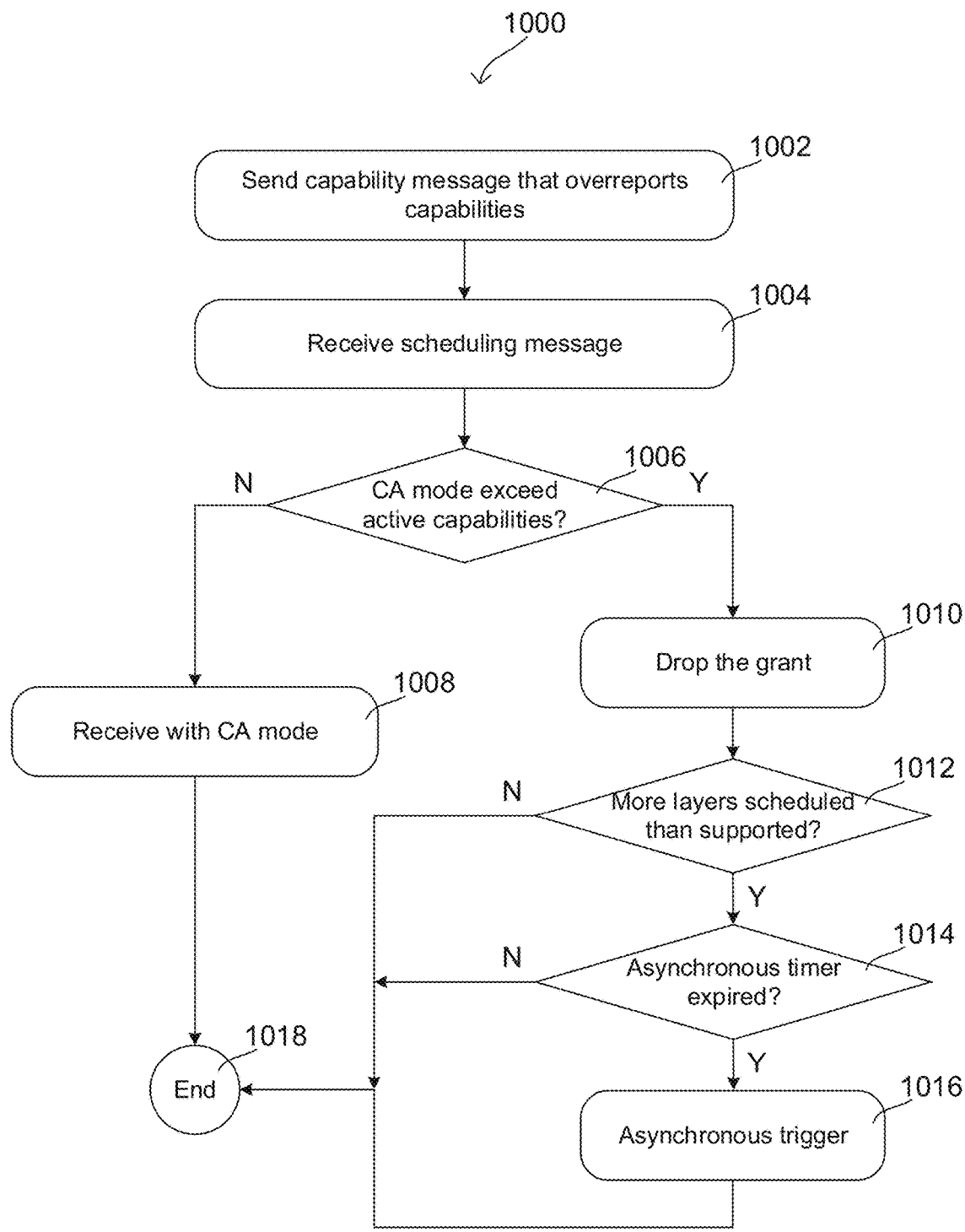
FIG. 10 shows an exemplary flow chart for sending overreported capability messages and responding to carrier aggregation mode scheduling according to some aspects.

Accordingly, when using this mechanism controller 304 may in stage 402 send a capability message to the network that overreports terminal device 102's capabilities. If the network then schedules a CA mode setup that exceeds terminal device 102's capabilities (e.g., sends scheduling messages that schedule more layers than the total number of supported antenna data streams), controller 304 may dynamically reassign device processing resources. By doing this, terminal device 102 may still comply with the network and maintain the carrier aggregation connection. FIG. 10 shows exemplary flowchart 1000 illustrating this procedure according to some aspects. As shown in FIG. 10, controller 304 may first generate and send a capability message that overreports terminal device 102's capabilities (e.g., where some of the reported CA modes have more total layers than terminal device 102's total number of supported antenna data streams) in stage 1002. The network may then add carriers, where it specifies MaxNumLayers for each carrier based on terminal device 102's reported capabilities. The network may then start sending scheduling messages that schedule downlink transmissions on one or more layers for each active carrier. The network may thus send one or more scheduling messages to terminal device 102. For example, like discussed above the network may send a separate scheduling message on each carrier that specifies the number of layers (rank) for that carrier, or may send one or more scheduling messages on one carrier that specifies the rank for that carrier and one or more additional carriers. Controller 304 may receive the scheduling messages (via RF transceiver 204 and antenna system 202) in stage 1004. The number of layers scheduled on each carrier may collectively form the CA mode scheduled by the network. The set of scheduling messages is referred to herein as scheduling signaling.

After receiving the scheduling messages, controller 304 may process them to determine the rank scheduled for each carrier (in addition to other downlink parameters relevant to receiving the data on each carrier in the upcoming subframe). Controller 304 may then determine, in stage 1006, whether the scheduled CA mode exceeds terminal device 102's active capabilities. For example, controller 304 may have previously selected a resource-carrier assignment that activated a certain number of antennas for each carrier. Specifically, controller 304 may have allocated a specific number of antenna-modem pathways (device processing resources) to each carrier, such as where controller 304 assigned some carriers 4rx (four active antennas) and assigned other carriers 2rx (two active antennas). The numbers of active antennas for each carrier forms terminal device 102's active capabilities.

Thus, in stage 1006 controller 304 may determine whether scheduled CA mode exceeds the active capabilities. For example, controller 304 may determine whether the scheduled rank (scheduled number of layers) for the first carrier is greater than the number of active antennas currently assigned to the first carrier. Controller 304 may similarly determine, for each remaining active carrier, whether the scheduled rank (scheduled number of layers) for the carrier is greater than the number of active antennas currently assigned to that carrier.

If controller 304 determines that the number of active antennas for each active carrier is the same or greater than the respectively scheduled rank for each active carrier, controller 304 may determine that the CA mode does not exceed the active capabilities. In other words, controller 304 may determine that each active carrier has enough active antennas to receive all scheduled layers on that carrier (e.g., the same or greater number). Controller 304 may then proceed to stage 1008, where terminal device 102 may receive data on the carriers with the scheduled CA mode. For example, controller 304 may control antenna system 202 and RF transceiver 204 to receive data on each carrier (e.g., to receive at least the same number of antenna data streams as the scheduled rank for each carrier) and to deliver the received data to baseband modem 206. Baseband modem 206 may then process the received data for each carrier to receive each individual layer, such as with a MIMO receiver. This may end the current iteration of the procedure at stage 1018. Controller 304 may repeat this process for the next set of scheduling messages (e.g., for the downlink grants in the next subframe).

Conversely, controller 304 may determine that the scheduled CA mode exceeds the active capabilities in stage 1006. For example, controller 304 may determine that the number of active antennas for at least one carrier is less than the scheduled rank for that carrier. In one example, a first carrier may only have 2rx (per the current resource-carrier assignment) while there are four layers scheduled for that carrier (e.g., scheduled rank four). Because there are more layers than active antennas, baseband modem 206 may not be able to recover all the layers with its MIMO receiver. Accordingly, controller 304 may drop the grant in stage 1010, meaning that terminal device 102 may not receive the layers on the carriers that do not have enough active antennas. This assumes that terminal device 102 cannot reassign device processing resources (e.g., activate other antennas for the carriers that do not have enough) quickly enough to receive the layers (e.g., later in the subframe). If terminal device 102 is configured to switch and activate antennas on different carriers with very low latency, then controller 304 may proceed to stage 1012 and attempt to reassign device processing resources quickly enough to receive the layers for the current grant. Even if terminal device 102 drops the grants for carriers that do not have enough active antennas, terminal device 102 may still receive the layers for other carriers that have enough active antennas.

While terminal device 102 may not be able to receive all layers for this subframe, terminal device 102 may be able to reassign device processing resources so it has enough active antennas to receive the layers in the next subframe (e.g., for a next grant; a next set of scheduling messages). Thus, controller 304 may determine, in stage 1012, whether the total number of scheduled layers (overall in the CA mode) is greater than the total number of supported layers, e.g., the maximum number of layers that terminal device 102 can receive at a time. This total number of supported layers is equal to the total number of supported antenna data streams, since terminal device 102 needs one antenna data stream per layer.

If the total number of scheduled layers is greater than the total number of supported layers, there is no reassignment of device processing resources that could assign enough active antennas to receive the layers on all carriers. Accordingly, controller 304 may not reassign the device processing resources, and may end the current procedure in stage 1018. This means terminal device 102 may lose the data for this grant. Controller 304 may then repeat the procedure starting at stage 1004 for the next set of scheduling messages from the network.

Conversely, if the total number of scheduled layers is less than or equal to the total number of supported layers, controller 304 may be able to reassign device processing resources so each carrier has enough active antennas to receive all of its scheduled layers. Controller 304 may therefore proceed to stage 1014, where it may check whether the asynchronous timer (of stage 418) has expired. As previously indicated, controller 304 may use the asynchronous timer to avoid triggering resource-carrier reassignments too often, and may therefore only trigger asynchronous reassignments when the timer has expired. If the asynchronous trigger has not expired in stage 1014, controller 304 may not trigger the resource-carrier reassignment and may end the procedure at stage 1018. Controller 304 may then repeat the procedure starting at stage 1004 for the next set of scheduling messages from the network.

If the asynchronous trigger has not expired, controller 304 may trigger asynchronous resource-carrier reassignment in stage 1016. Because terminal device 102 supports at least the same number total layers as scheduled layers, controller 304 may be able to determine an updated resource-carrier assignment with enough active antennas to receive the scheduled layers on each carrier. For example, controller 304 may assign, for each carrier, at least enough antenna-modem pathways (device processing resources) to receive all scheduled layers on that carrier (e.g., at least the same number of antenna data streams as scheduled layers). This means that each carrier will have enough active antennas to receive all scheduled layers (e.g., if the network uses the same CA mode in the next grant). Controller 304 may additionally assign (or reassign) the advanced baseband features to carriers, such as based on the efficiency metrics and maximizing a utility function. If terminal device 102 supports more total layers than are scheduled, controller 304 may have extra antenna-modem pathways to allocate. Controller 304 may additionally assign (or reassign) these device processing resources to carriers, such as based on the efficiency metrics and maximizing a utility function.

This may yield an updated resource-carrier assignment that allocates enough active antennas to receive the layers on all carriers. If the network schedules the same CA mode for the next grant, controller 304 may determine in stage 1006 that its active capabilities meet the scheduled CA mode. In that case, controller 304 may therefore be able to receive with the CA mode in stage 1008 for that next grant.

Accordingly, even when terminal device 102 overreports its capabilities, terminal device 102 may still be able to dynamically reassign device processing resources to receive all the layers on upcoming grants. Terminal device 102 may thus reduce the control signaling overhead for the capability messages. While there may be a chance that the network schedules a CA mode that exceeds terminal device 102's active capabilities, controller 304 may be able to reduce that likelihood via its rank reporting. For example, when 3GPP UEs receive multi-layer MIMO, they perform channel measurements and report channel state information (CSI) back to the network. The network then schedules upcoming MIMO downlink grants based on the reported CSI. One CSI parameter is the rank indicator (RI). Using terminal device 102 as an example, measurement engine 308 may perform channel measurements on the received data for each channel (carrier). Based on the channel measurements, controller 304 may determine how many layers (i.e., what rank) the channel can support. For instance, if there is high SNR and strong multipath scattering, the channel may be able to support more layers, such as two or four versus only one. Conversely, when there is poor SNR and weak multipath conditions, the channel may only be able to support one layer. Controller 304 may therefore determine a rank indicator based on the channel measurements and send the rank indicator to the network (as CSI). The network may then schedule upcoming downlink grants based on the reported rank.

When terminal device 102 overreports its capabilities and is receiving on the various active carriers, measurement engine 308 may only do the channel measurement on each carrier with the current active antennas for that carrier. For example, if controller 304 assigned 2rx to a first carrier, measurement engine 308 may perform its channel measurement only with those two active antennas. When controller 304 determines the rank indicator based on that channel measurement, controller 304 will not select a rank indicator greater than two because there are only two active antennas to begin with. In other words, controller 304 will select a rank indicator based on the number of active antennas it wants to use (per the resource-carrier assignment). Controller 304 therefore will not report a higher rank indicator higher than the number of active antennas on a given carrier.

Because the reported rank indicator will be limited by the number of active antennas, the network will likely follow the reported rank indicators for each carrier. Accordingly, if the network follows the reported rank indicators, it will not schedule more layers than the number of active antennas for each carrier. Terminal device 102 may therefore influence the network to schedule a rank on each carrier that terminal device 102 can receive with its current resource-carrier assignment. If the network does not follow the reported rank indicators, the network may schedule too many layers on at least one carrier, meaning that terminal device 102 may perform stages 1010-1016. In many scenarios, the network may initially start scheduling downlink grants with a low rank (e.g., the lowest rank in the 3GPP parameter code bookSubsetRestriction from RRC signaling). In turn, terminal device 102 may be able to start influencing the network to limit its scheduled layers on each carrier before the network starts scheduling ranks that are too large for the current resource-carrier assignment.

Furthermore, as previously discussed terminal device 102 may occasionally consider changing the number of active antennas assigned to each carrier. For example, when controller 304 triggers a resource-carrier reassignment (e.g., stage 406), controller 304 may consider whether to add or remove antenna data streams (device processing resources; mapping to active antennas) to or from certain carriers. To do this, terminal device 102 may perform test measurements to estimate the throughput gain and/or power penalty from assigning more or fewer active antennas to certain carriers. For example, a first carrier may be currently assigned two active antennas (2rx; by the current resource-carrier assignment) but controller 304 is considering increasing this to four active antennas (4rx) for an updated resource-carrier assignment. Although measurement engine 308 may perform channel measurements with four active antennas, controller 304 may restrict the reported CSI measurement (e.g., RI, in addition to precoding matrix indicator (PMI) and channel quality indicator (CQI)) to a virtual number of active antennas, e.g., two. By restricting the CSI measurements, terminal device 102 may avoid a scenario where the network schedules four layers before controller 304 has decided to switch the first carrier from 2rx to 4rx. In other words, controller 304 may hide the fact that terminal device 102 has four active antennas on the first carrier while doing the measurement, and may only start reporting rank four after if it actually decides to boost the first carrier from 2rx to 4rx.

Figure 11:
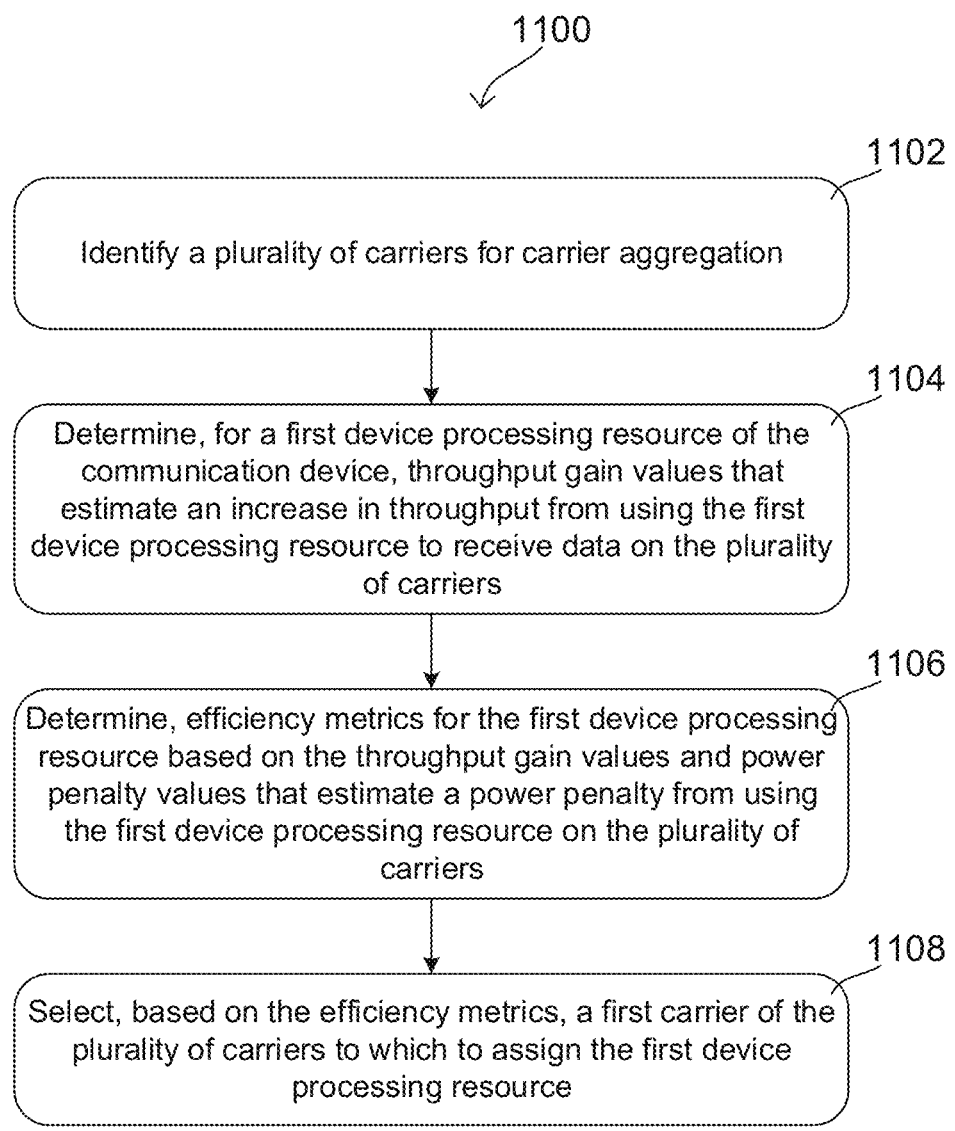
FIGS. 11-12 show exemplary methods of performing wireless communications at a communication device according to some aspects.

FIG. 11 shows exemplary method 1100 of performing wireless communications at a communication device according to some aspects. As shown in FIG. 11, method 1100 includes identifying a plurality of carriers for carrier aggregation (stage 1102), determining, for a first device processing resource of the communication device, throughput gain values that estimate an increase in throughput from using the first device processing resource to receive data on the plurality of carriers (stage 1104), determining efficiency metrics for the first device processing resource based on the throughput gain values and power penalty values that estimate a power penalty from using the first device processing resource on the plurality of carriers (stage 1106), and selecting, based on the efficiency metrics, a first carrier of the plurality of carriers to which to assign the first device processing resource (stage 1108).

Figure 12:
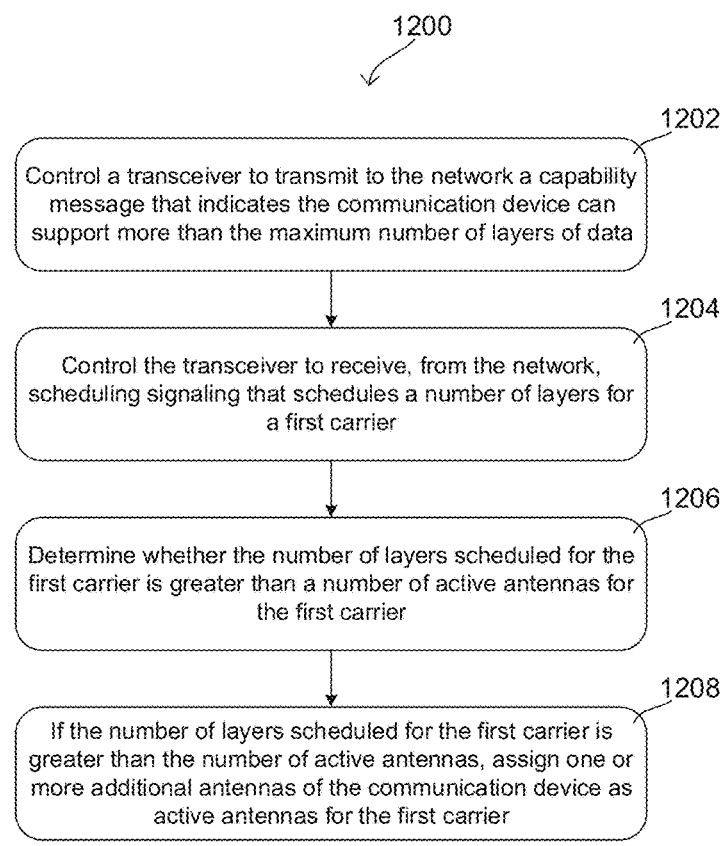

FIG. 12 shows exemplary method 1200 of method of performing wireless communications at a communication device, the communication device configured to receive a maximum number of layers of data from a second communication device with carrier aggregation according to some aspects. As shown in FIG. 12, method 1200 includes controlling a transceiver to transmit to the network a capability message that indicates the communication device can support more than the maximum number of layers of data (1202), controlling the transceiver to receive, from the network, scheduling signaling that schedules a number of layers for a first carrier (1204), determining whether the number of layers scheduled for the first carrier is greater than a number of active antennas for the first carrier (1206), and if the number of layers scheduled for the first carrier is greater than the number of active antennas, assigning one or more additional antennas of the communication device as active antennas for the first carrier (1208).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples disclose various aspects of this disclosure:

Example 1 is a method of performing wireless communications at a communication device, the method including identifying a plurality of carriers for carrier aggregation, determining, for a first device processing resource of the communication device, throughput gain values that estimate an increase in throughput from using the first device processing resource to receive data on the plurality of carriers, determining efficiency metrics for the first device processing resource based on the throughput gain values and power penalty values that estimate a power penalty from using the first device processing resource on the plurality of carriers, and selecting, based on the efficiency metrics, a first carrier of the plurality of carriers to which to assign the first device processing resource.

In Example 2, the subject matter of Example 1 can optionally further include controlling a transceiver or a baseband modem to receive carrier aggregation data on the first carrier with the first device processing resource.

In Example 3, the subject matter of Example 1 or 2 can optionally include wherein a first efficiency metric of the efficiency metrics is based on the ratio of the throughput gain value to the power penalty value for the first device processing resource and the first carrier, the method further including determining an updated efficiency metric for the first device processing resource and the first carrier, and releasing the first device processing resource from the first carrier if the updated efficiency metric is less than the first efficiency metric.

In Example 4, the subject matter of any one of Examples 1 to 3 can optionally include wherein each throughput gain value estimates an increase in throughput from using the first device processing resource to receive on a respective one of the plurality of carriers.

In Example 5, the subject matter of any one of Examples, wherein each can optionally include metric is based on the throughput gain value for a respective one of the plurality of carriers and based on the power penalty from using the first device processing resource on that same respective one of the plurality of carriers.

In Example 6, the subject matter of any one of Examples 1 to 5 can optionally include wherein each of the efficiency metrics corresponds to a pairing of the first device processing resource with a respective one of the plurality of carriers, and wherein selecting the first carrier to which to assign the first device processing resource includes selecting the first carrier based on the efficiency metric that corresponds to the pairing of the first carrier with the first device processing resource.

In Example 7, the subject matter of any one of Examples 1 to 5 can optionally include wherein each of the efficiency metrics corresponds to a pairing of the first device processing resource with a respective one of the plurality of carriers, and wherein selecting the first carrier to which to assign the first device processing resource includes determining that the first carrier maps to the highest-valued efficiency metric of the efficiency metrics.

In Example 8, the subject matter of any one of Examples 1 to 5 can optionally further include determining additional efficiency metrics based on pairings of the plurality of device processing resources with the plurality of carriers, where the additional efficiency metrics are based on throughput gain values and power penalty values from using the plurality of device processing resources with the plurality of carriers.

In Example 9, the subject matter of Example 8 can optionally further include assigning the plurality of device processing resources to the plurality of carriers based on attempting to maximize a sum of efficiency metrics from the assigned pairings of device processing resources to carriers.

In Example 10, the subject matter of Example 8 can optionally further include assigning the plurality of device processing resources to the plurality of carriers based on attempting to maximize a utility function that depends on the sum of the efficiency metrics from the assigned pairings of device processing resources to carriers.

In Example 11, the subject matter of Example 8 can optionally further include assigning the plurality of device processing resources to the plurality of carriers based on a greedy search that selects, for a given device processing resource, a carrier that has a highest-valued efficiency metric when paired with the device processing resource.

In Example 12, the subject matter of any one of Examples 1 to 11 can optionally include wherein identifying the plurality of carriers includes receiving, via a transceiver, a scheduling message that schedules data transmissions on the plurality of carriers with carrier aggregation.

In Example 13, the subject matter of any one of Examples 1 to 12 can optionally include wherein the first device processing resource include a plurality of pathways for carrying data from antennas of the communication device to a baseband modem of the communication device.

In Example 14, the subject matter of any one of Examples 1 to 12 can optionally include wherein the first device processing resource include one or more advanced baseband features each configured to perform a baseband processing operation on received data for a carrier.

In Example 15, the subject matter of any one of Examples 1 to 14 can optionally include wherein the first device processing resource is a plurality of pathways between antennas of the communication device and a baseband modem of the communication device, the method further including controlling a transceiver or the baseband modem to receive data on the first carrier by using the plurality of pathways to deliver a plurality of antenna data streams from the antennas to the baseband modem.

In Example 16, the subject matter of any one of Examples 1 to 15 can optionally include wherein the first device processing resource is an advanced baseband feature configured to perform a baseband processing operation on received data for a carrier, the method further including controlling a transceiver to receive data on the first carrier, and routing the data to the first device processing resource for processing.

In Example 17, the subject matter of any one of Examples 1 to 16 can optionally include wherein determining a first throughput gain value for the first device processing resource and the first carrier includes determining a baseline throughput value that estimates throughput on the first carrier when using a baseline level of device processing resources, determining an adjusted throughput value that estimates throughput on the first carrier when using both the baseline level of device processing resources and the first device processing resource, and determining the first throughput gain value based on a ratio of the adjusted throughput value to the baseline throughput value.

In Example 18, the subject matter of Example 17 can optionally include wherein determining the adjusted throughput value includes determining the adjusted throughput value based on a channel measurement for the first carrier.

In Example 19, the subject matter of Example 18 can optionally further include performing a signal-to-noise ratio (SNR) measurement to obtain the channel measurement.

In Example 20, the subject matter of Example 18 or 19 can optionally include wherein determining the adjusted throughput value further includes determining the adjusted throughput value based on one or more of a maximum number of layers of data that can be scheduled for the first carrier, a number of transmit antennas for the first carrier, a number of receive antenna data streams that the communication device can deliver from one or more antennas to a baseband modem, or a highest constellation order supported for modulation schemes on the first carrier.

In Example 21, the subject matter of Example 20 can optionally include wherein determining the adjusted throughput value further includes identifying a plurality of polynomial values based on the maximum number of layers, the number of receive antenna data streams, or the highest constellation order, and determining the adjusted throughput value based on a sum of the polynomial values multiplied by the channel measurement.

In Example 22, the subject matter of Example 20 can optionally include wherein determining the adjusted throughput value further includes determining the adjusted throughput value with an equation based on the channel measurement and one or more of the maximum number of layers, the number of receive antenna data streams, or the highest constellation order.

In Example 23, the subject matter of any one of Examples 1 to 22 can optionally include wherein determining a first efficiency metric for the first device processing resource and the first carrier includes identifying a first power penalty value that estimates an increase in power from using the first device processing resource on the first carrier, and determining the first efficiency metric for the first device processing resource based on a ratio of a first throughput gain value for the first device processing resource to the first power penalty value.

In Example 24, the subject matter of Example 23 can optionally include wherein determining the first efficiency metric based on the ratio of the first throughput gain value to the first power penalty value includes determining the ratio of the first throughput gain value to the first power penalty value, and determining the first efficiency metric by scaling the ratio by one or more of a bandwidth of the first carrier, a time scheduling rate of the first carrier, or a frequency scheduling rate of the first carrier.

In Example 25, the subject matter of any one of Examples 1 to 24 can optionally further include determining, for a second device processing resource of the communication device, throughput gain values that estimate an increase in throughput from using the second device processing resource to receive data on the plurality of carriers, determining efficiency metrics for the second device processing resource based on the throughput gain values and power penalty values that estimate a power penalty from using the second device processing resource on the plurality of carriers, and selecting, based on the efficiency metrics, a second carrier of the plurality of carriers to which to assign the first device processing resource.

Example 26 is a communication device including a controller configured to identify a plurality of carriers for carrier aggregation, and an estimation processor configured to determine, for a first device processing resource of the communication device, throughput gain values that estimate an increase in throughput from using the device processing resource with the plurality of carriers, the controller further configured to determine efficiency metrics for the first device processing resource based on the throughput gain values and power penalty values that estimate a power penalty from using the first device processing resource with the plurality of carriers, and select, based on the efficiency metrics, a first carrier of the plurality of carriers to which to assign the first device processing resource.

In Example 27, the subject matter of Example 26 can optionally include wherein the controller is further configured to control a transceiver or a baseband modem to receive carrier aggregation data on the first carrier with the first device processing resource.

In Example 28, the subject matter of Example 27 can optionally further include the transceiver and the baseb and modem.

In Example 29, the subject matter of any one of Examples 26 to 28 can optionally include wherein a first efficiency metric of the efficiency metrics is based on the ratio of throughput gain value to the penalty value for the first device processing resource and the first carrier, the controller further configured to determine an updated efficiency metric for the first device processing resource and the first carrier, and to release the first device processing resource from the first carrier if the updated efficiency metric is less than the first efficiency metric.

In Example 30, the subject matter of any one of Examples 26 to 29 can optionally include wherein each throughput gain value estimates an increase in throughput from using the first device processing resource to receive on a respective one of the plurality of carriers.

In Example 31, the subject matter of any one of Examples 26 to 30 can optionally include wherein each efficiency metric is based on the throughput gain value for a respective one of the plurality of carriers and based on the power penalty from using the first device processing resource on that same respective one of the plurality of carriers.

In Example 32, the subject matter of any one of Examples 26 to 31 can optionally include wherein each of the efficiency metrics corresponds to a pairing of the first device processing resource with a respective one of the plurality of carriers, and wherein the controller is configured to select the first carrier to which to assign the first device processing resource by identifying the first carrier based on the efficiency metric that corresponds to the pairing of the first carrier with the first device processing resource.

In Example 33, the subject matter of any one of Examples 26 to 31 can optionally include wherein each of the efficiency metrics corresponds to a pairing of the first device processing resource with a respective one of the plurality of carriers, and wherein the controller is configured to select the first carrier to which to assign the first device processing resource by determining that the first carrier maps to the highest-valued efficiency metric of the efficiency metrics.

In Example 34, the subject matter of any one of Examples 26 to 31 can optionally include wherein the controller is further configured to determine additional efficiency metrics based on pairings of the plurality of device processing resources with one or more additional carriers, where the additional efficiency metrics are based on throughput gain values and power penalty values from using the plurality of device processing resources with the one or more additional carriers.

In Example 35, the subject matter of Example 34 can optionally include wherein the controller is further configured to assign the plurality of device processing resources to the plurality of carriers based on attempting to maximize a sum of the efficiency metrics from the assigned pairings of device processing resources to carriers.

In Example 36, the subject matter of Example 34 can optionally include wherein the controller is further configured to assign the plurality of device processing resources to the plurality of carriers based on attempting to maximize a utility function that depends on the sum of the efficiency metrics from the assigned pairings of device processing resources to carriers.

In Example 37, the subject matter of Example 34 can optionally include wherein the controller is further configured to assign the plurality of device processing resources to the plurality of carriers based on a greedy search that selects, for a given device processing resource, a carrier that has a highest-valued efficiency metric when paired with the device processing resource.

In Example 38, the subject matter of any one of Examples 26 to 37 can optionally include wherein the controller is configured to identify the plurality of carriers by receiving, via a transceiver, a scheduling message that schedules data transmissions on the plurality of carriers with carrier aggregation.

In Example 39, the subject matter of any one of Examples 26 to 38 can optionally further include the first device processing resource, wherein the first device processing resource includes a plurality of pathways for carrying data from antennas of the communication device to a baseband modem of the communication device.

In Example 40, the subject matter of Example 39 can optionally include wherein the controller is further configured to receive data on the first carrier by using the plurality of pathways to deliver a plurality of antenna data streams from the antennas to the baseband modem.

In Example 41, the subject matter of any one of Examples 26 to 38 can optionally further include the first device processing resource, wherein the first device processing resource is an advanced baseband feature configured to perform a baseband processing operation on received data for a carrier.

In Example 42, the subject matter of Example 41 can optionally include wherein the controller is further configured to control a transceiver to receive data on the first carrier, and to route the data to the first device processing resource for processing.

In Example 43, the subject matter of any one of Examples 26 to 42 can optionally include wherein the estimation processor is further configured to determine a first throughput gain value for the first device processing resource and the first carrier by determining a baseline throughput value that estimates throughput on the first carrier when using a baseline level of device processing resources, determining an adjusted throughput value that estimates throughput on the first carrier when using both the baseline level of device processing resources and the first device processing resource, and determining the first throughput gain value based on a ratio of the adjusted throughput value to the baseline throughput value.

In Example 44, the subject matter of Example 43 can optionally include wherein the estimation processor is configured to determine the adjusted throughput value by determining the adjusted throughput value based on a channel measurement for the first carrier.

In Example 45, the subject matter of Example 44 can optionally further include a measurement engine configured to perform a signal-to-noise ratio (SNR) measurement to obtain the channel measurement.

In Example 46, the subject matter of Example 44 or 45 can optionally include wherein the estimation processor is configured to determine the adjusted throughput value further based on one or more of a maximum number of layers of data that can be scheduled for the first carrier, a number of transmit antennas for the first carrier, a number of receive antenna data streams that the communication device can deliver from one or more antennas to a baseband modem, or a highest constellation order supported for modulation schemes on the first carrier.

In Example 47, the subject matter of Example 46 can optionally include wherein the estimation processor is configured to determine the adjusted throughput value by identifying a plurality of polynomial values based on the maximum number of layers, the number of receive antenna data streams, or the highest constellation order, and determining the adjusted throughput value based on a sum of the polynomial values multiplied by the channel measurement.

In Example 48, the subject matter of Example 46 can optionally include wherein the estimation processor is configured to determine the adjusted throughput value by determining the adjusted throughput value with an equation based on the channel measurement and one or more of the maximum number of layers, the number of receive antenna data streams, or the highest constellation order.

In Example 49, the subject matter of any one of Examples 26 to 48 can optionally include wherein the controller is configured to determine a first efficiency metric for the first device processing resource and the first carrier by identifying a first power penalty value that estimates an increase in power from using the first device processing resource on the first carrier, and determining the first efficiency metric for the first device processing resource based on a ratio of a first throughput gain value for the first device processing resource to the first power penalty value.

In Example 50, the subject matter of Example 49 can optionally include wherein the controller is configured to determine the first efficiency metric based on the ratio of the first throughput gain value to the first power penalty value by determining the ratio of the first throughput gain value to the first power penalty value, and determining the first efficiency metric by scaling the ratio by one or more of a bandwidth of the first carrier, a time scheduling rate of the first carrier, or a frequency scheduling rate of the first carrier.

In Example 51, the subject matter of any one of Examples 26 to 50 can optionally include wherein the estimation processor is further configured to determine, for a second device processing resource of the communication device, throughput gain values that estimate an increase in throughput from using the second device processing resource to receive data on the plurality of carriers, and wherein the controller is further configured to determine efficiency metrics for the second device processing resource based on the throughput gain values and power penalty values that estimate a power penalty from using the second device processing resource on the plurality of carriers, and select, based on the efficiency metrics, a second carrier of the plurality of carriers to which to assign the first device processing resource.

Example 52 is a method of performing wireless communications at a communication device, the communication device configured to receive a maximum number of layers of data from a network with carrier aggregation, the method including controlling a transceiver to transmit to the network a capability message that indicates the communication device can support more than the maximum number of layers of data, controlling the transceiver to receive, from the network, scheduling signaling that schedules a number of layers for a first carrier, determining whether the number of layers scheduled for the first carrier is greater than a number of active antennas for the first carrier, and if the number of layers scheduled for the first carrier is greater than the number of active antennas, assigning one or more additional antennas of the communication device as active antennas for the first carrier.

In Example 53, the subject matter of Example 52 can optionally include wherein assigning the one or more additional antennas as active antennas for the first carrier includes identifying one or more available antennas, that when added to the number of active antennas for the first carrier, at least equals the number of layers scheduled for the first carrier, and assigning the one or more available antennas to the first carrier.

In Example 54, the subject matter of Example 52 or 53 can optionally include wherein the scheduling signaling includes a scheduling message that schedules layers for the first carrier, the method further including processing the scheduling message to determine the number of layers scheduled for the first carrier.

In Example 55, the subject matter of any one of Example 52 to 54 can optionally further include comparing the number of layers scheduled for the first carrier to the number of active antennas for the first carrier.

In Example 56, the subject matter of any one of Examples 52 to 55 can optionally include wherein the scheduling signaling includes one or more scheduling messages that schedule a total number of layers for a plurality of carriers including the first carrier, the method further including determining whether the total number of layers scheduled for the plurality of carriers is greater than the maximum number of layers.

In Example 57, the subject matter of Example 56 can optionally include wherein assigning the one or more additional antennas of the communication device as active antennas for the first carrier includes assigning the one or more additional antennas of the communication device as active antennas for the first carrier if the number of layers scheduled for the first carrier is greater than the number of active antennas and if the total number of layers scheduled for the plurality of carriers is fewer than or equal to the maximum number of layers.

In Example 58, the subject matter of any one of Examples 52 to 57 can optionally further include generating the capability message, wherein the capability message specifies a number layers on which the communication device can receive for each of a plurality of carriers of a carrier aggregation connection between the communication device and a network.

In Example 59, the subject matter of Example 58 can optionally include wherein the maximum number of layers of data that the communication device can receive is based on a number of pathways from a plurality of antennas of the communication device to a baseband modem of the communication device.

In Example 60, the subject matter of any one of Examples 52 to 59 can optionally include wherein the scheduling signaling includes one or more scheduling messages that schedule a total number of layers for a plurality of carriers including the first carrier, the method further including if, for each carrier of the plurality of carriers, a number of active antennas for that carrier is equal to or greater than the scheduled number of layers for that carrier, controlling the transceiver to receive the scheduled total number of layers on the plurality of carriers.

In Example 61, the subject matter of any one of Examples 52 to 60 can optionally include wherein the maximum number of layers of data is limited by a number of antenna-modem pathways of the communication device that deliver data from antennas to a baseband modem.

In Example 62, the subject matter of any one of Examples 52 to 61 can optionally further include before controlling the transceiver to receive the scheduling message, assigning one or more antenna-modem pathways of the communication device to the first carrier, wherein the antenna-modem pathways deliver data from antennas to a baseband modem and wherein the number of active antennas for the first carrier is equal to the number of antenna-modem pathways.

In Example 63, the subject matter of Example 62 can optionally include wherein assigning the one or more antenna-modem pathways of the communication device to the first carrier includes determining a throughput gain value that estimates an increase in throughput from using the one or more antenna-modem pathways to receive data on the first carrier, determining an efficiency metric for the one or more antenna-modem pathways based on the throughput gain value and a power penalty value that estimates a power penalty from using the one or more antenna-modem pathways on the first carrier, and assigning the one or more antenna-modem pathways to the first carrier based on the efficiency metric.

Example 64 is a communication device including a plurality of pathways configured to deliver data from a plurality of antennas to a baseband modem, the plurality of pathways configured to receive a maximum number of layers of data from a network with carrier aggregation, and a controller configured to control a transceiver to transmit to the network a capability message that indicates the communication device can support more than the maximum number of layers of data, control the transceiver to receive, from the network, scheduling signaling that schedules a number of layers for a first carrier, determine whether the number of layers scheduled for the first carrier is greater than a number of active antennas for the first carrier, and if the number of layers scheduled for the first carrier is greater than the number of active antennas, assign one or more additional antennas of the communication device as active antennas for the first carrier.

In Example 65, the subject matter of Example 64 can optionally further include the transceiver and the one or more antennas.

In Example 66, the subject matter of Example 64 or 65 can optionally include wherein the controller is configured to assign the one or more additional antennas as active antennas for the first carrier by identifying one or more available antennas that, when added to the number of active antennas for the first carrier, at least equals the number of layers scheduled for the first carrier, and assigning the one or more available antennas to the first carrier.

In Example 67, the subject matter of any one of Examples 64 to 66 can optionally include wherein the scheduling signaling includes a scheduling message that schedules layers for the first carrier, wherein the controller is further configured to process the scheduling message to determine the number of layers scheduled for the first carrier.

In Example 68, the subject matter of any one of Examples 64 to 67 can optionally include wherein the controller is further configured to compare the number of layers scheduled for the first carrier to the number of active antennas for the first carrier.

In Example 69, the subject matter of any one of Examples 64 to 68 can optionally include wherein the scheduling signaling includes one or more scheduling messages that schedule a total number of layers for a plurality of carriers including the first carrier, the controller further configured to determine whether the total number of layers scheduled for the plurality of carriers is greater than the maximum number of layers.

In Example 70, the subject matter of any one of Examples 64 to 69 can optionally include wherein the controller is configured to assign the one or more additional antennas of the communication device as active antennas for the first carrier if the number of layers scheduled for the first carrier is greater than the number of active antennas and if the total number of layers scheduled for the plurality of carriers is fewer than or equal to the maximum number of layers.

In Example 71, the subject matter of any one of Examples 64 to 70 can optionally include wherein the controller is further configured to generate the capability message, wherein the capability message specifies a number layers on which the communication device can receive for each of a plurality of carriers of a carrier aggregation connection between the communication device and a network.

In Example 72, the subject matter of Example 71 can optionally include wherein the maximum number of layers of data that the communication device can receive is based on a number of pathways from a plurality of antennas of the communication device to a baseband modem of the communication device.

In Example 73, the subject matter of any one of Examples 64 to 72 can optionally include wherein the scheduling signaling includes one or more scheduling messages that schedule a total number of layers for a plurality of carriers including the first carrier, wherein the controller is further configured to if, for each carrier of the plurality of carriers, a number of active antennas for that carrier is equal to or greater than the scheduled number of layers for that carrier, control the transceiver to receive the scheduled total number of layers on the plurality of carriers.

In Example 74, the subject matter of any one of Examples 64 to 73 can optionally include wherein the maximum number of layers of data is limited by a number of antenna-modem pathways of the communication device that deliver data from antennas to a baseband modem.

In Example 75, the subject matter of any one of Examples 64 to 74 can optionally include wherein the controller is further configured to before controlling the transceiver to receive the scheduling message, assign one or more antenna-modem pathways of the communication device to the first carrier, wherein the antenna-modem pathways deliver data from antennas to a baseband modem and wherein the number of active antennas for the first carrier is equal to the number of antenna-modem pathways.

In Example 76, the subject matter of Example 75 can optionally include wherein the controller is configured to assign the one or more antenna-modem pathways of the communication device to the first carrier by determining a throughput gain value that estimates an increase in throughput from using the one or more antenna-modem pathways to receive data on the first carrier, determining an efficiency metric for the one or more antenna-modem pathways based on the throughput gain value and a power penalty value that estimates a power penalty from using the one or more antenna-modem pathways on the first carrier, and assigning the one or more antenna-modem pathways to the first carrier based on the efficiency metric.

Example 77 is a non-transitory computer readable medium storing instructions that, when executed by one or more processors of a communication device, cause the communication device to perform the method of any one of Examples 1 to 25 or 52 to 63.

Example 78 is a communication device including one or more processors configured to perform the method of any one of Examples 1 to 25 or 52 to 63.

Example 79 is a communication device including one or more processors, and a memory storing instructions that, when executed by one or more processors of a communication device, cause the communication device to perform the method of any one of Examples 1 to 25 or 52 to 63.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
a controller configured to identify a plurality of carriers for carrier aggregation; and
an estimation processor configured to determine, for a first device processing resource of the communication device, throughput gain values that estimate an increase in throughput from using the device processing resource with the plurality of carriers;
the controller further configured to:
determine efficiency metrics for the first device processing resource based on the throughput gain values and power penalty values that estimate a power penalty from using the first device processing resource with the plurality of carriers,
determine a first efficiency metric for the first device processing resource based on a ratio of a first throughput gain value for the first device processing resource to a first power penalty value; and
select, based on the efficiency metrics, a first carrier of the plurality of carriers to which to assign the first device processing resource.

2. The communication device of claim 1, wherein the controller is further configured to control a transceiver or a baseband modem to receive carrier aggregation data on the first carrier with the first device processing resource.

3. The communication device of claim 2, further comprising the transceiver and the baseband modem.

4. The communication device of claim 1, wherein each throughput gain value estimates an increase in throughput from using the first device processing resource to receive on a respective one of the plurality of carriers.

5. The communication device of claim 1, wherein each efficiency metric is based on the throughput gain value for a respective one of the plurality of carriers and based on the power penalty from using the first device processing resource on that same respective one of the plurality of carriers.

6. The communication device of claim 1, wherein the controller is further configured to determine additional efficiency metrics based on pairings of the plurality of device processing resources with one or more additional carriers, where the additional efficiency metrics are based on throughput gain values and power penalty values from using the plurality of device processing resources with the one or more additional carriers.

7. The communication device of claim 6, wherein the controller is further configured to assign the plurality of device processing resources to the plurality of carriers based on attempting to maximize a sum of the efficiency metrics from the assigned pairings of device processing resources to carriers.

8. The communication device of claim 1, further comprising the first device processing resource, wherein the first device processing resource comprises a plurality of pathways for carrying data from antennas of the communication device to a baseband modem of the communication device.

9. The communication device of claim 8, wherein the controller is further configured to receive data on the first carrier by using the plurality of pathways to deliver a plurality of antenna data streams from the antennas to the baseband modem.

10. The communication device of claim 1, wherein the estimation processor is further configured to determine a first throughput gain value for the first device processing resource and the first carrier by:
determining a baseline throughput value that estimates throughput on the first carrier when using a baseline level of device processing resources;
determining an adjusted throughput value that estimates throughput on the first carrier when using both the baseline level of device processing resources and the first device processing resource; and
determining the first throughput gain value based on a ratio of the adjusted throughput value to the baseline throughput value.

11. The communication device of claim 1, wherein the first power penalty value that estimates an increase in power from using the first device processing resource on the first carrier.

12. A communication device comprising:
a plurality of pathways configured to deliver data from a plurality of antennas to a baseband modem, the plurality of pathways configured to receive a maximum number of layers of data from a network with carrier aggregation; and
a controller configured to:

control a transceiver to transmit to the network a capability message that indicates the communication device can support more than the maximum number of layers of data;

control the transceiver to receive, from the network, scheduling signaling that schedules a number of layers for a first carrier;

determine whether the number of layers scheduled for the first carrier is greater than a number of active antennas for the first carrier; and if the number of layers scheduled for the first carrier is greater than the number of active antennas, assign one or more additional antennas of the communication device as active antennas for the first carrier.

13. The communication device of claim 12, further comprising the transceiver and the one or more antennas.

14. The communication device of claim 12, wherein the controller is configured to assign the one or more additional antennas as active antennas for the first carrier by:

identifying one or more available antennas that, when added to the number of active antennas for the first carrier, at least equals the number of layers scheduled for the first carrier; and assigning the one or more available antennas to the first carrier.

15. The communication device of claim 12, wherein the controller is further configured to generate the capability message, wherein the capability message specifies a number layers on which the communication device can receive for each of a plurality of carriers of a carrier aggregation connection between the communication device and a network.

16. The communication device of claim 15, wherein the maximum number of layers of data that the communication device can receive is based on a number of pathways from a plurality of antennas of the communication device to a baseband modem of the communication device.

17. The communication device of claim 12, wherein the scheduling signaling comprises one or more scheduling messages that schedule a total number of layers for a plurality of carriers including the first carrier, wherein the controller is further configured to:

if, for each carrier of the plurality of carriers, a number of active antennas for that carrier is equal to or greater than the scheduled number of layers for that carrier, control the transceiver to receive the scheduled total number of layers on the plurality of carriers.

18. The communication device of claim 12, wherein the controller is further configured to:

before controlling the transceiver to receive the scheduling signaling, assign one or more antenna-modem pathways of the communication device to the first carrier, wherein the one or more antenna-modem pathways deliver data from antennas to a baseband modem, and wherein the number of active antennas for the first carrier is equal to a number of the one or more antenna-modem pathways.

19. A method of performing wireless communications at a communication device, the method comprising:

identifying a plurality of carriers for carrier aggregation;

determining, for a first device processing resource of the communication device, throughput gain values that estimate an increase in throughput from using the first device processing resource to receive data on the plurality of carriers;

determining efficiency metrics for the first device processing resource based on the throughput gain values and power penalty values that estimate a power penalty from using the first device processing resource on the plurality of carriers;

determining a first efficiency metric for the first device processing resource based on a ratio of a first throughput gain value for the first device processing resource to a first power penalty value; and selecting, based on the efficiency metrics, a first carrier of the plurality of carriers to which to assign the first device processing resource.

20. The method of claim 19, wherein the first power penalty value that estimates an increase in power from using the first device processing resource on the first carrier.

* * * * *